United States Patent
Takahashi et al.

[11] Patent Number: 5,959,998
[45] Date of Patent: Sep. 28, 1999

[54] CHANNEL SELECTION METHOD FOR AN ISDN LINE AND AN ISDN SWITCHING SYSTEM THEREFOR

[75] Inventors: Shigekazu Takahashi; Norio Yamamoto, both of Sendai, Japan

[73] Assignee: Fujitsu Limited, Kanagawa, Japan

[21] Appl. No.: 08/760,183

[22] Filed: Dec. 4, 1996

[30] Foreign Application Priority Data

Apr. 9, 1996 [JP] Japan ..................................... 8-086624

[51] Int. Cl.⁶ .................................................. H04L 12/28
[52] U.S. Cl. ........................................... 370/431; 370/904
[58] Field of Search .................................... 370/385, 391, 370/410, 412, 414, 420, 431, 462, 463, 465, 468, 524, 904, 437, 466; 455/450, 452, 453

[56] References Cited

U.S. PATENT DOCUMENTS

| | | | |
|---|---|---|---|
| 5,463,629 | 10/1995 | Ko ........................................... | 370/463 |
| 5,561,771 | 10/1996 | Harriman, Jr. et al. ................. | 370/410 |
| 5,574,724 | 11/1996 | Bales et al. ............................ | 370/410 |
| 5,574,861 | 11/1996 | Lorvig et al. ........................... | 370/524 |
| 5,615,213 | 3/1997 | Greifer .................................... | 370/412 |

FOREIGN PATENT DOCUMENTS 4144395  5/1992  Japan .
5153674  6/1993  Japan .

*Primary Examiner*—Huy D. Vu
*Assistant Examiner*—Chiho Andrew Lee
*Attorney, Agent, or Firm*—Helfgott & Karas, PC

[57] ABSTRACT

An H channel for controlling the use of network is selected to effectively use lines when a request for H communication is issued. An ISDN line channel selection method, whereby a plurality of B channels are bundled and serve as an H channel, and the B channels are selected according to a condition under which each of the B channels to be used is registered as either an H channel dedicated class or H channel shared use class. The method includes the steps of temporarily changing the b channels from the H channel shared use class to the H channel dedicated class if the B channels in the H channel shared use class are busy when a request for connection of the H channel has been received from a transmission side, queuing until the B channels that form the H channel dedicated class are idle, and connecting the transmission side to the H channel when the B channels that form the H channel dedicated class are idle. The class of the B channels that has been changed to an original class when connection has been completed or when communication has been terminated and disconnected, is restored.

27 Claims, 12 Drawing Sheets

Fig. 9

| 8 | 7 | 6 | 5 | 4 | 3 | 2 | 1 |
|---|---|---|---|---|---|---|---|
| | facility data element number ||||||||
| | data content length ||||||||
| 1 exten- sion | 0 reserve | 0 | service application<br>1  1  1  1  1 |||||
| 1 colspan=2 class | 0 | 1 type | colspan=5 0  0  0  0  1<br>component type tag |||||
| | component length ||||||||
| 0 colspan=2 class | 0 | 0 type | colspan=5 0  0  0  1  0<br>component identifier tag |||||
| | evoke identifier length ||||||||
| | evoke identifier ||||||||
| 0 colspan=2 class | 0 | 0 type | colspan=5 0  0  1  1  0<br>operation value tag |||||
| | operation value length ||||||||
| 0 | operation |||||||
| | note 1) provided operation ||||||||
| | note 2) argument ||||||||

CHANNEL SELECTION METHOD FOR AN ISDN LINE AND AN ISDN SWITCHING SYSTEM THEREFOR

BACKGROUND OF THE INVENTION

1. Field of the Invention

The present invention relates to a connection method for H channels (an $H_0$ channel and an $H_1$ channel) in an ISDN system, and to an ISDN switch and a terminal for employing that method.

2. Related Arts

While a channel of 64 kbps is a basic B channel, 23 of these B channels and a D data channel form a 23B+D channel arrangement for ISDN transmission.

Six of 23 B channels are bundled to provide a single $H_0$ channel, and 24 B channels are bundled to provide a single $H_1$ channel. In this case, these $H_0$ and $H_1$ channels are collectively called as H channels.

Various methods have been developed for selecting an H channel. One selection method for selecting the H channel is disclosed in the Japanese Laid Open Patent Application No. Tokukai-Hei 4-144,395, and in the selection method, an $H_0$ dedicated class or a general communication class of 64 kpbs is registered for each B channel that is a constituent of an H channel.

For $H_0$ communication, B channels for the $H_0$ dedicated class are acquired, and for general communication, the B channels for the general communication class are acquired.

An allowable class and a regulated class for general communication are registered for each B channel. For $H_0$ communication, all of the B channels are acquired, and for general communication, channels other than those in the regulated class are acquired.

With this method, when an $H_1$ communication class is set, the channels can not be used for communication with the other class, and the efficiency in the use of lines is reduced. When a class is set for shared use while communicating with the other class, a block rate for $H_1$ communication is increased.

When all of the B channels required for formation of the H channel can not be obtained, a method is employed whereby a line connection is performed when necessary B channels are obtained using a queuing system (see the Japanese Laid Open Patent Application No. Tokukai-Hei 5-153674, for example).

According to this method, when the B channels forming the H channel are randomly used, it takes a long time for the required sequential B channels to be obtained. Further, for a tandem connection, even if the B channels required between specific switches are obtained, they can not be used for communication with another H channel until B channels that are required between other switches are obtained.

Considering that the $H_1$ communication is to be ensured between specific switches in a network, generally, channels by which other general calls are enabled are acquired between the switches. For an instance where channels are not divided into classes, according to a technique that is disclosed in the Japanese Laid Open Patent Application Tokukai-Hei 4-144395, channels that enable a plurality of $H_1$ communications may be used separately for general calls. A queuing time will be extended and continues until the $H_1$ communication request is realized.

This is the same as where channels that enable $H_1$ communication are separately used for $H_0$ communication calls.

Further, in accordance with recent progress in data compression techniques, a purpose for which communication is employed by a user, for example, the transmission of image data can to a degree be satisfied even by a communication speed of 64 kbps.

As is described above, in a network wherein H communication ($H_0$ or $H_1$) via H channels, and general communication via B channels can jointly exist, the provision of channels exclusively for H communication is not economical in the viewpoint of the effective use of the network, because traffic for general transmission such as telephone or facsimile communication is higher than H communication.

SUMMARY OF THE INVENTION

It is, therefore, an object of the present invention to provide a selection method for an H channel, such as an $H_0$ channel or an $H_1$ channel, whereby the use of channels in a network is so controlled that they are effectively employed when an H communication request is initiated, and to provide an ISDN switch and terminal equipment by which to perform the selection method.

It is a further object of the present invention to provide an H channel selection method, whereby an H communication request is acquired even if a necessary communication quality is temporarily deteriorated, and when a facility for satisfying the required communication quality is ensured, the communication quality is changed to that required quality; and to provide an ISDN switch and a terminal by which to perform the selection method.

It is a more object of the present invention to provide a selection method for an H channel, such as an $H_0$ channel or an $H_1$ channel, whereby are reduced a block rate relative to an H communication request, a queuing time for an H channel, which is obtained between switches, and unnecessary queuing time for H channels that are aquired between switches; and to provide an ISDN switch and a terminal by which to perform the selection method.

To achieve the above objects of the present invention, as the basic structure, an ISDN line channel selection method for selecting B channels, which are bundled and serve as an H channel, according to a condition whereunder each of said B channels to be used are registered as either an H channel dedicated class or H channel shared use class, comprising the steps of: temporarily changing said B channels from said H channel shared use class to said H channel dedicated class if said B channels in said H channel shared use class are busy when a request for connection of said H channel has been received from a transmission side; queuing until said B channels that form said H channel dedicated class are idle; connecting said transmission side to said H channel when said B channels that form said H channel dedicated class are idel; and restoring said class of said B channels that has been changed to an original class when connection has been completed or when communication is terminated and is disconnected.

Further, to achieve the above objects of the present invention, the basic structure of an ISDN switch system, wherein a plurality of B channels are bundled to serve as an H channel, and the B channels are selected according to a condition whereunder each of the B channels to be used is registered as an H channel dedicated class or H channel shared use class, and wherein, when a request for transmission using the H channel is received from a transmission terminal and B channels providing a requested data transfer speed are not ensured, a data transfer speed at which data transmission is enabled is reported to the transmission terminal, includes: means for acquiring a second data transfer speed, at which data transmission is enabled, that is included in a transmission request, which is transmitted by the transmission terminal at a first data transfer speed; means for acquiring, from the H channel shared use class, and connecting a B channel that is required for the second data transfer speed, which is included in the transmission request, and for temporarily changing, to the H channel dedicated class, sequential B channels, including the previously connected B channel, that are required for a requested data transfer speed; storage means for storing changes in channel classes; means for requesting, for each predetermined time at a transmitter, a transmission at the requested data transfer speed via B channels, including the previously connected B channel; means for, when all B channels in the H channel dedicated class that the previously connected B channel belongs to, temporarily acquiring all of the B channels except for the previously connected B channel; means for, when the requested transfer speed included in the transmission request is enabled at a receiver, transmitting reserved transmission ready information to the requesting transmitter; means for, when the requested transfer speed included in the transmission request is disabled, transmitting reserved transmission not ready information to the requesting transmitter; means for, upon receipt of the reserved transmission not ready information, releasing the B channels temporarily acquired; means for notifying a transmission terminal that the transmission at the requested data transfer speed has been enabled by the transmitter that has received the reserved transmission ready information; means for, upon receipt of a request from the transmission terminal for channel switching from the first data transfer speed to the second data transfer speed, returning the channel class of the B channels that are temporarily acquired to the H channel shared use class, and for connecting paths of the B channels between the transmitter and the receiver; and means for notifying the transmission terminal that connection of the paths has been completed.

In addition, to achieve the above described objects of the present invention, as the basic structure, an ISDN switch system for selecting B channels, which are bundled and serve as an H channel, according to a condition whereunder each of said B channels to be used are registered as either an H channel dedicated class or H channel shared use class, receiving a request for transmission using H channel from a transmission terminal and notifying a data transfer speed at which data transmission is enabled to said transmission terminalths, when B channels providing a requested data transfer speed are not ensured, includes extraction means for acquiring a second data transfer speed, at which data transmission is enabled, that is included in a transmission request, which is transmitted by said transmission terminal at a first data transfer speed; means for acquiring, from said H channel shared use class, and connecting a B channel that is required for said second data transfer speed, which is included in said transmission request, and for temporarily changing, to said H channel dedicated class, sequential B channels, including said previously connected B channel that are required for a requested data transfer speed; storage means for storing changes in channel classes; means for requesting, for each predetermined time at a transmitter, a transmission at said requested data transfer speed via B channels, including said previously connected B channel; means for, when all B channels in said H channel dedicated class that said previously connected B channel belongs to, temporarily acquiring all of said B channels except for said previously connected B channel; means for, when said requested transfer speed included in said transmission request is enabled at a receiver, transmitting reserved transmission ready information to said requesting transmitter; means for, when said requested transfer speed included in said transmission request is disabled, transmitting reserved transmission not ready information to said requesting transmitter; means for, upon receipt of said reserved transmission not ready information, releasing said B channels temporarily acquired; means for notifying a transmission terminal that said transmission at said requested data transfer speed has been enabled by said transmitter that has received said reserved transmission ready information; path control means for, upon receipt of a request from said transmission terminal for channel switching from said first data transfer speed to said second data transfer speed, restoring said channel class of said B channels that are temporarily acquired to said H channel shared use class, and for connecting paths of said B channels between said transmitter and said receiver; and means for notifying said transmission terminal that connection of said paths has been completed.

In addition, to achieve the above described objects of the present invention, as the basic structure, as ISDN terminal connected to an ISDN switch for selecting B channels, which are bundled and serve as an H channel, according to a condition whereunder each of said B channels to be used are registered as either an H channel dedicated class or H channel shared use class, includes: means for, upon receipt of a notice from said ISDN switch that transmission at a requested data transfer speed has been enabled, displaying a data transfer speed at which channel switching is permitted; means for ascertaining whether or not a request for channel switching is present; means for notifying said ISDN switch that channel switching has been requested; means for, upon receipt of a notification from said ISDN switch that said channel switching has been completed, employing B channels that are to be changed and B channels that are currently being used for communication to switch a communication speed that is currently being used for communication to a new communication speed; and means for, when channel switching has been requested and said channel switching means has completed said channel switching, notifying a switch that said channel switching has been completed.

BRIEF DESCRIPTION OF THE DRAWINGS

FIG. 9 is a diagram illustrating an example facility data element edition format;

DETAILED DESCRIPTION OF THE PREFERRED EMBODIMENT

Figure 1:
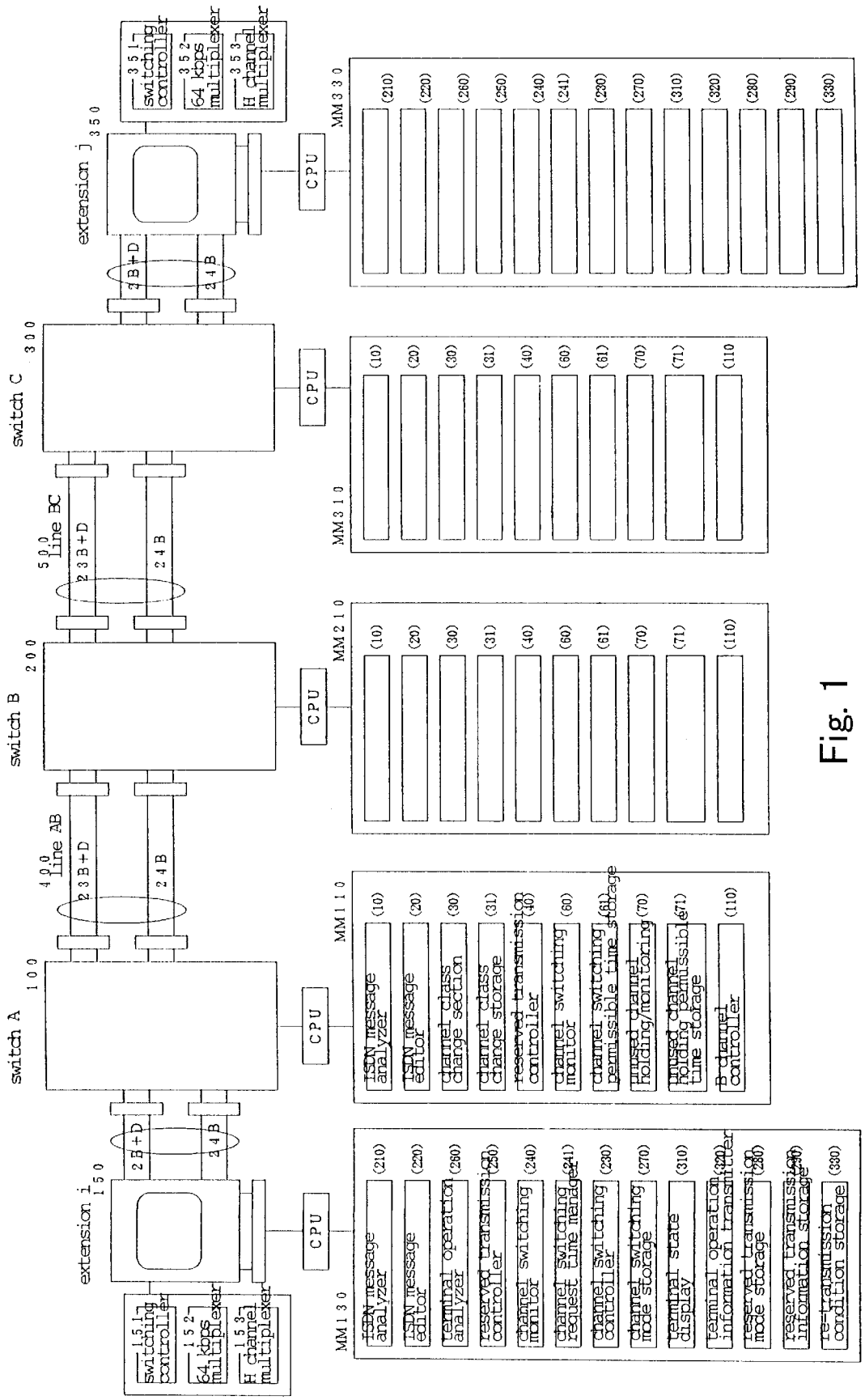
FIG. 1 is a block diagram illustrating one embodiment of the present invention.

The preferred embodiment of the present invention will now be described while referring to the accompanying drawings. The same reference numerals or symbols are used to denote corresponding or identical components.

FIG. 1 shows a block diagram of an embodiment of the present invention. In FIG. 1, messages for a TV conference are transmitted from a transmission terminal 150, which has an extension number "i" connected to a switch A, which is a transmitter 100, via a switch B, which is a relay switch 200, to a reception terminal 350, which has an extension number "j" connected to a switch C, which is a receiver 300.

The transmission terminal 150 and the reception terminal 350 have CPUs and the respective main memories 130 and 330 having the same structure. Individual protocol functions that are stored in the main memory 130 and 330 are executed by the CPUs to perform communication.

The transmitter 100, the relay center 200 and the receiver 300, which have the same structure, include CPUs and the respective main memories 110, 210 and 310, as do the terminals 150 and 350. The individual protocol functions that are stored in the main memories 110, 210 and 310, which have the same structure, are executed by the CPUs during the communication process. The protocol functions that are stored in the main memory will be explained later.

The switches A and B are connected by an A-B line 400 that consists of an ISDN line of 23B+D channels and an ISDN line of 24 B channels. The switches B and C are connected by a B-C line 500 that is formed in the same manner.

The switch A and the terminal 150, and the switch C and the terminal 300 are respectively connected by the ISDN lines of 2B+D and 24B channels.

Figure 2:
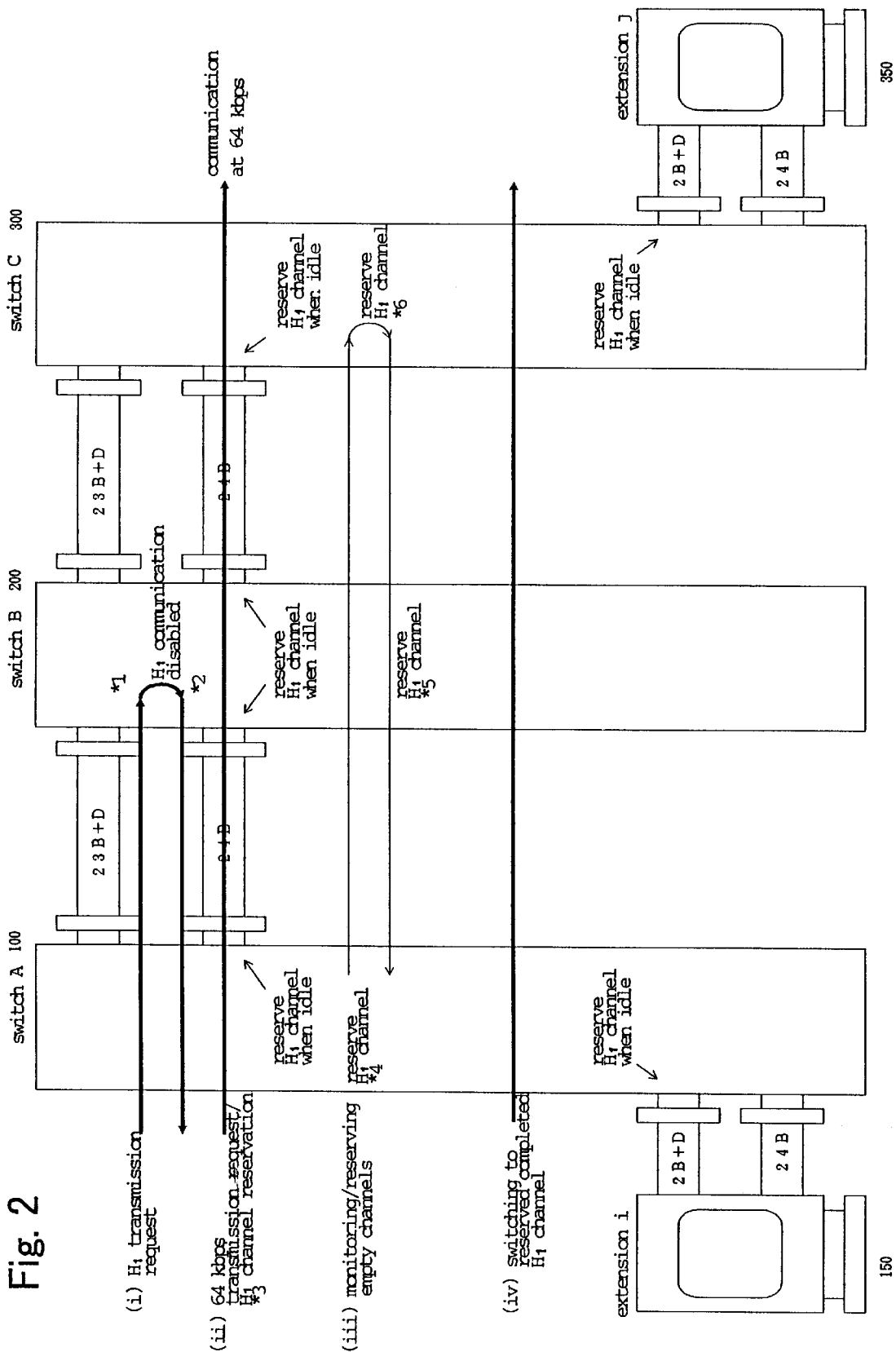
FIG. 2 is a diagram for explaining the feature of the present invention.

FIG. 2 is a diagram for explaining the feature of the present invention while using an example wherein a message originating during a TV conference is transmitted from the transmission terminal 150 of the extension i, which is connected to the switch A that is the transmitter 100 in FIG. 1, to the reception terminal 350 of the extension j, which is connected to the switch C that is the receiver 300.

(i) For transmission of a video conferencing message at the communication speed $H_1$ from the extension i to the extension j, transmission is performed from the extension i to the extension j at the communication speed $H_1$. At this time, however, in the B-C line 500 between the switches B and C, no B channel exists in an H channel dedicated class through which $H_1$ communication is possible, and a transmission not ready notice (*1) is transmitted.

(ii) When, on the other hand, a B channel, via which the communication can be performed at 64 kbps, is present in the H channel shared use class, and between the extension i of the transmission terminal 100 and the switch A 100 and between the extension j of the reception terminal 350 and the switch C 300, and along the line AB between the switches A and B, there are idle B channels enough to enable $H_1$ communication, the $H_1$ channel is reserved, and the idle B channels of 64 kbps for common calls are employed for communication.

(iii) While communication is being performed via the idle B channels, the $H_1$ channel is reserved and constant monitoring is performed to keep it idle, and when the reserved $H_1$ channel is temporarily acquired, it is reported to the transmitter 100.

(iv) Then, when the reservation has been completed, the channel is changed to the reserved $H_1$ channel and communication is begun via that channel.

As is described above, according to the present invention, even if necessary communication quality is temporarily reduced relative to an H communication request, the communication request is obtained, and, when the facility that satisfies the necessary communication quality is obtained, the communication quality is switched to the one required.

Figure 3:
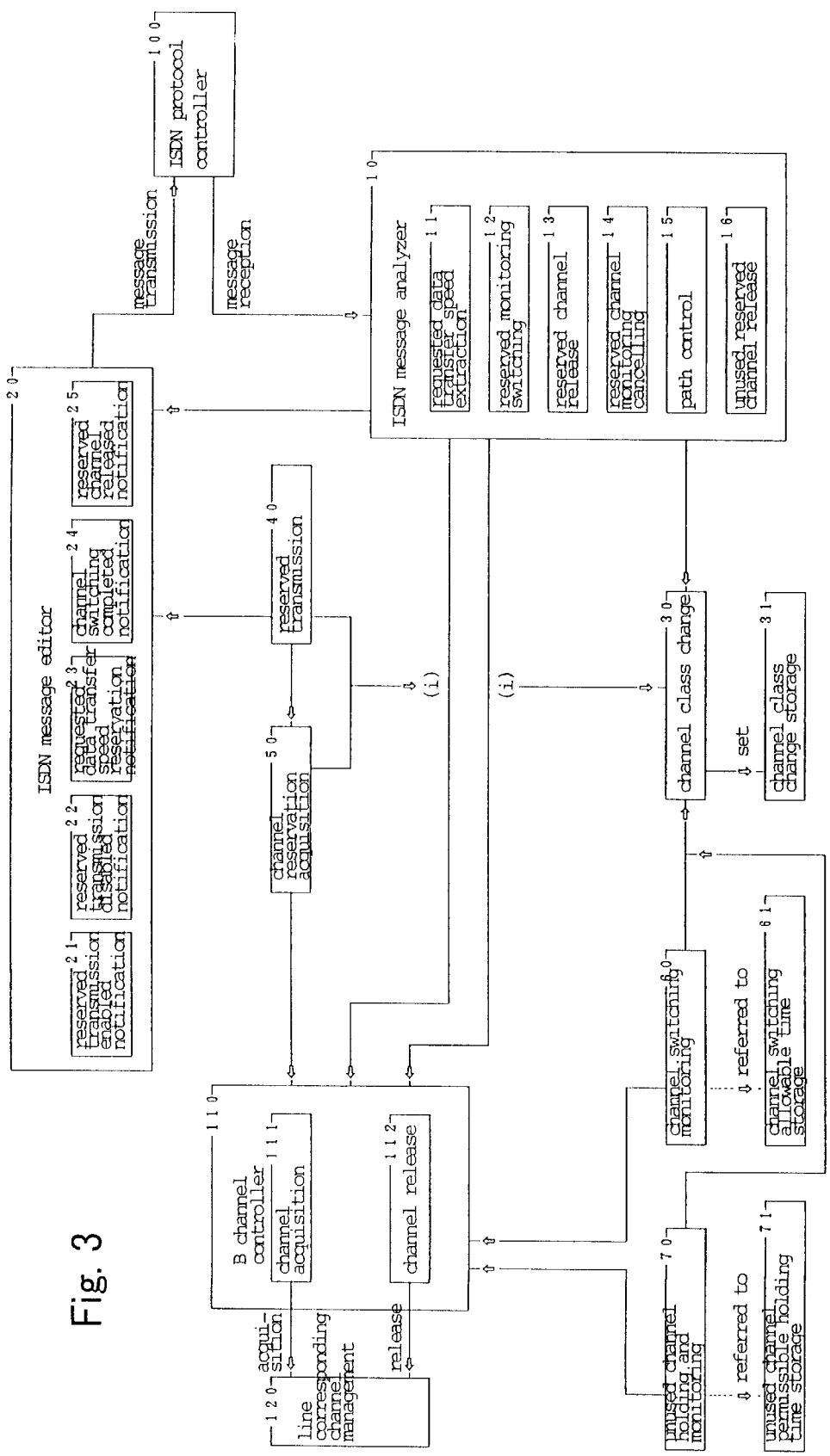
FIG. 3 is a diagram for explaining the structure of a terminal for carrying out a method according to the present invention.

FIG. 3 is a block diagram illustrating the arrangement of each of the ISDN switches A, B and C in FIG. 1 with which the feature of the present invention shown in FIG. 2 can be carried out. In FIG. 3, an ISDN protocol control means 100 controls the ISDN D-channel protocol between switches, and between a switch and a terminal. An ISDN message is received by the ISDN protocol control means 100 and is analyzed by ISDN message analysis means 10.

The ISDN message analysis means 10 has the following components:

means 11 for, when a transmission request is received via an ISDN message, extracting a required data transfer speed from the transmission request;

means 12 for, when a reservation monitoring switching notice is received via an ISDN message, continuously monitoring, for a call to a switching destination, a B channel that is currently being monitored for a call from a switching source;

means 13 for, when a reserved transmission not ready notice is received via an ISDN message, releasing the temporarily acquired B channels for which the channel class is stored in a channel class change storage section 31;

means 14 for, when a reservation monitoring release is received via an ISDN message, canceling the activation of reserved transmission means 40 that issues a transmission request at a specific time interval, and for restoring the B channel class that is stored in the means 31 to the H channel shared use class;

path control means 15 for, when a channel switching request is received via an ISDN message, restoring the B channel class that is stored in the channel class change storage section 31 to the H channel shared use class, and for connecting the transmitter and the receiver by using a path between B channels that are temporarily acquired and whose channel class is stored in the channel class change storage section 31; and means 16 for, when a channel switching request is received via an ISDN message, comparing the number of the B channels that have been temporarily acquired and reserved by the switch with the number of B channels that are requested according to the channel switching request, and for, when there are unused B channels among those that are reserved, releasing the unused B channels, and restoring the B channel class to the H channel shared use class.

Means 20 edits an ISDN message and includes the following components:

means 21 for, when a receiver is ready to accept a transmission at a requested data transfer speed, setting in an ISDN message, information notifying a transmitter that reserved transmission is enabled;

means 22 for, when a receiver is not ready to accept a transmission at a requested data transfer speed, setting in an ISDN message, information notifying a transmitter that reserved transmission is disabled;

means 23 for, when a receiver is ready to accept a transmission at a requested data transfer speed, setting in an ISDN message, information notifying a transmission terminal that transmission at the requested data transfer speed is enabled;

means 24 for, when a path between temporarily acquired B channels connects the transmitter and the receiver, setting in an ISDN message, information notifying the transmission terminal that the path connection has been completed; and means 25 for, when a channel switching request is not received from a terminal within a permissible period for the acceptance of a channel switching request, setting in an ISDN message, information notifying the receiver of the release of the temporarily acquired B channels.

When the channel class change means 30 receives a request for a change from the H channel shared use class to the H channel dedicated class, the channel class change means 30 changes the class of the B channels that are assigned for class changing from the H channel shared use class to the H channel dedicated class, and the channels for which the class is changed are stored in the channel class change storage section 31.

When the channel class change means 30 receives a request for a change from the H channel dedicated class to the H channel shared use class, the channel class change means 30 changes the class of the B channels that are assigned for class changing from the H channel dedicated class to the H channel shared use class, and deletes the B channels, which are designated for class changing, from the channel class change storage section 31.

In FIG. 3, reservation means 40 temporarily acquires B channels relative to reserved channel acquisition means 50 each time that is specified by a system, and issues a request, for transmission at a data transfer speed, that includes the connected B channels.

If all of the B channels stored in the channel class change storage section 31, including the connected B channels, can be acquired, the reserved channel acquisition means 50 acquires all of the B channels except the connected B channels.

Channel switching monitoring means 60 monitors a permissible period of time wherein a channel switching request will be accepted from the transmission terminal. When the time exceeds the permissible time, the channel switching monitoring means 60 releases the temporarily acquired B channels and restores the channel class of the acquired B channels to the H channel shared use class.

Means 61 stores the permissible time period for the acceptance of a channel switching request, relative to the channel switching monitoring means 60.

Unused channel holding and monitoring means 70 monitors the permissible time that elapses before unused B channels from among the temporarily acquired B channels are released. When the permissible time period has elapsed, the unused channel holding and monitoring means 70 releases the temporarily acquired B channels and restores the channel class of the released B channels to the H channel shared use class. Means 71 stores the permissible time that elapses before the unused B channels are released by the unused channel holding and monitoring means 70.

Means 110 employs channel acquisition means 111 and channel release means 112 to acquire and release the B channels. The channel acquisition means 111 acquires B channels that are managed by line corresponding channel management means 120. The channel release means 112 releases the B channels that are managed by the line corresponding channel management means 120.

Figure 4:
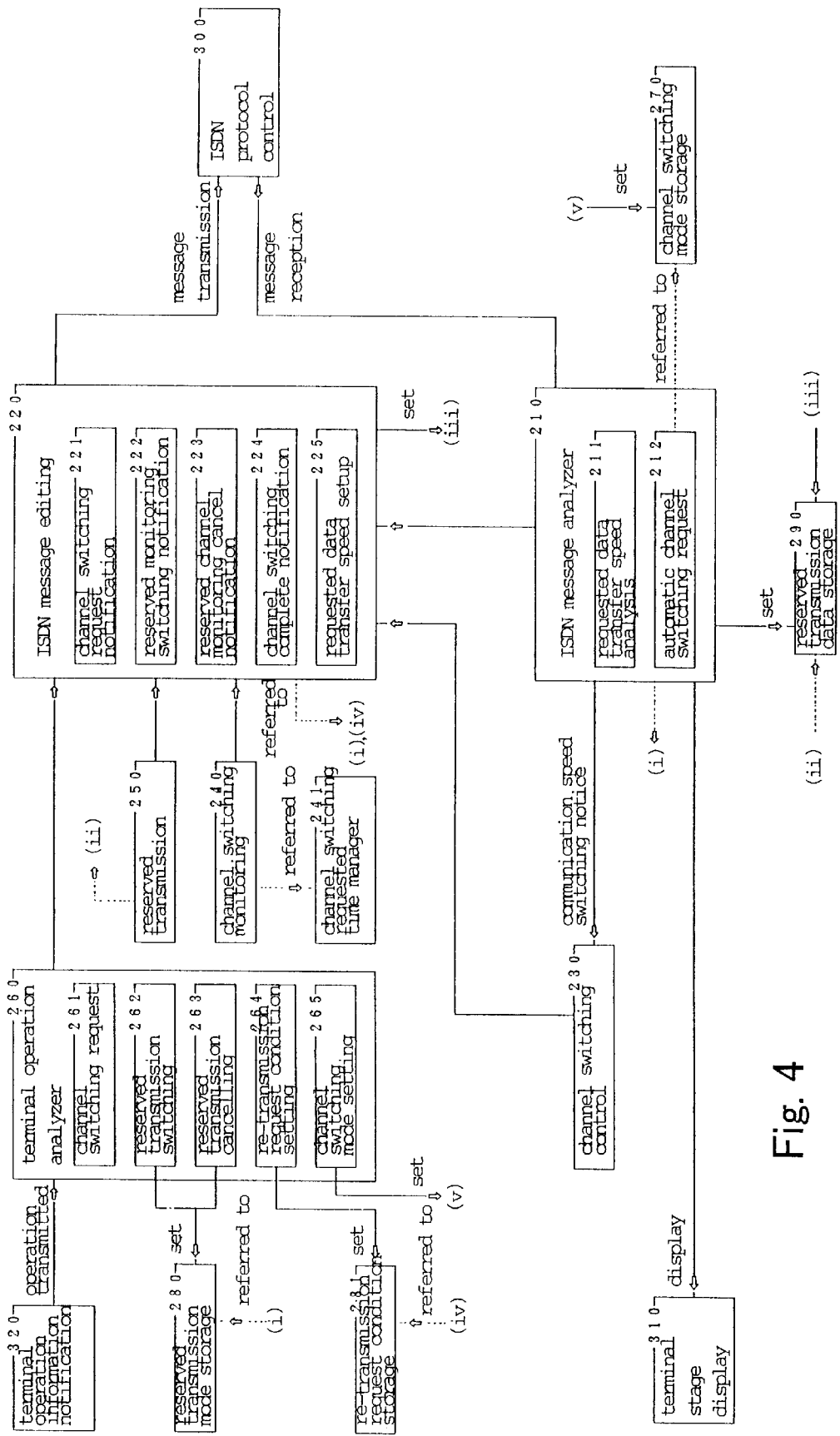
FIG. 4 is a diagram for explaining the structure of a terminal for carrying out the method of the present invention.

FIG. 4 is a block diagram illustrating the arrangement of each of the ISDN terminals 150 and 350, with which the feature of the present invention shown in FIG. 2 can be carried out. In FIG. 4, means 210 analyzes an ISDN message, which is received by means 300, for controlling an ISDN D-channel protocol between a switch and a terminal.

The ISDN message analysis means 210 includes: means 211 for, when the received ISDN message indicates that a requested data transfer speed is ready for use, displaying on the terminal, an available data transfer speed that is notified; and means 212 for, when the received ISDN message indicates that a requested data transfer speed is ready for use, automatically activating channel switching request notification means 221 to issue a channel switching request to a switch.

Means 220 for editing an ISDN message includes:

means 221 for, when a channel switching request for an available data transfer speed is issued to a switch, setting in an ISDN message, information for the channel switching request;

means 222 for, when a communication speed for a current call is changed to a communication speed for a new call by operation of the terminal, setting in an ISDN message, information indicating that continuation of the monitoring of the B channels reserved for the call to be switched is requested, based on a switching destination call;

means 223 for, when the monitoring of the reserved B channels is canceled by operation of the terminal, setting in an ISDN message, information indicating that cessation of the monitoring of the reserved B channels is requested;

channel switching completion notification means 224 for, when switching of a communication speed is completed upon a request from a switch for channel switching, setting in an ISDN message, information indicting that channel switching has been completed; and means 225 for, when the B channels that are required for transmission at a requested data transfer speed can not be obtained and notification of a data transfer speed at which transmission is enabled has been made, setting in an ISDN message, a communication speed for requesting channel monitoring in accordance with a re-transmission condition (presence of re-transmission, or a data transfer speed for re-transmission).

When a channel switching request is received by operation of a terminal, or when an ISDN message that indicates a channel switching request has been received from the switch, channel switching means 230 employs B channels that are to be changed and B channels that are currently used for communication to switch from a current communication speed to a new communication speed. When the channel switching has been completed in accordance with the channel switching request from the switch, the channel switching means 230 activates channel switching completion notification means 224 to notify the switch that channel switching has been completed.

When an ISDN message is received indicting that a necessary data transfer speed is available, channel switching monitoring means 240 performs monitoring for a permissible period until the channel switching request is issued by operation of the terminal. When the period of time exceeds the permissible time, the channel switching monitoring means 240 automatically activates channel switching request notification means 221 to permit the switch to issue a channel switching request.

Means 241 stores a permissible period until a channel switching request is issued by operation of the terminal.

Means 250 sends a transmission request to the switch at a data transfer speed including the connected B channels, for every predetermined time that is specified by the terminal.

Means 260 that analyzes the operation of the terminal includes:

means 261 for, when the operation for switching channels is performed at the terminal, activating the channels switching request notification means 221 to issue a channel switching request to the switch;

means 262 for, when a current communication speed for a call is changed and a new communication speed is assigned for the call, changing a call, which is reserved for transmitting data to a switch, from a switching source to a switching destination (new call), and for activating the reservation monitoring/switching notification means 222 to request that the switch changes a reserved call to a new call to be monitored;

means 263 for, when an operation is performed to cancel a reserved transmission, canceling the reserved transmission to the switch, and for activating the reserved channel monitoring cancel notification means 223 to request that the switch cancels the reserved monitoring of the B channels;

means 264 for, when the operation for setting a re-transmission condition is performed, setting the re-transmission condition to storage means 281; and means 265 for, when the operation for selecting a channel switching mode is performed, storing the selected channel switching mode in channel switching mode storage means 270.

The means 270 is used to store a manual mode or an automatic mode for issuing a channel switching request to the switch. Means 280 is used to store a mode indicating whether or not reserved transmission should be performed. Means 290 is used to store a communication speed when reserved transmission is to be performed, and the presence/absence of a reserved transmission request. Means 330 is used to store a re-transmission condition when transmission at a requested data transfer speed is disabled.

Display means 310 displays the state of the terminal for a user by using characters and lamps. Means 320 notifies the terminal of information entered when a user operated the terminal.

As is described above, according to the present invention, an ISDN change is provided that, when a plurality of B channels (64 kbps) for an ISDN line are bundled for use as an H channel ($H_0$ or $H_1$), selects the B channels in accordance with the condition whereunder the H channel dedicated class ($H_0$ dedicated, or $H_1$ dedicated) or the H channel shared use class (shared with a 64 kbps call) is registered for the B channels.

The ISDN protocol means 100 receives an H channel connection request from the transmission side. When a request for communication using the H channel is issued while the B channels in the H channel shared use class are being used, the B channels in the H channel shared use class are temporarily changed to the H channel dedicated class ($H_0$ or $H_1$ use only).

As a result, except for the H channel connection request transmission is inhibited, a block rate relative to the request for H communication can be reduced, and an H channel queuing time that is acquired by the switch can be shortened.

Queuing is performed until the B channels in the H channel dedicated class are idle. When the B channels are idle, the transmission side is connected to the H channel. When the connection is completed, or when the communication is terminated and the line is disconnected, the class that was changed can be restored to its original class.

When the ISDN switch 100 has received the H channel connection request from the ISDN terminal 150 and can not obtain the B channels that are required for H channel connection, the ISDN switch 100 notifies the ISDN terminal 150 that the H channel connection is disabled and provides a data transfer speed that will be available for the connection.

The ISDN terminal 150 performs re-transmission at the data transfer speed that is available for the connection, and requests the B channels to be obtained for which the required data transfer speed is enabled. Upon the receipt of the request, the ISDN switch 100 temporarily sets the communication condition for a data transfer speed that is available for the connection by which to obtain the communication request.

The B channels via which the requested data transfer speed can be provided are monitored. When the B channels become idle, they are reserved. Then, a notice that the required data transfer speed is now available is transmitted to the ISDN terminal 150, and in accordance with a selection by the ISDN terminal 150, the communication speed can be changed to the required data transfer speed.

When the transmitter 100 has issued a request, including across the connected B channels, for transmission at a requested data transfer speed for a specific time (which can be altered by the system), and has acquired all of the B channels in the H channel dedicated class, including the connected B channels, the ISDN switch 200 temporarily acquires the B channels. When the receiver 300 is not ready to receive a transmission at the requested data transfer speed, the ISDN switch 200 transmits the reserved transmission not ready information to the transmitter 100, and releases the B channels that are temporarily acquired, so that unnecessary H channel queuing between the switches can be reduced.

Further, the condition whereunder the ISDN switch is monitoring the B channels at the requested data transfer speed can be terminated by operation of the transmission terminal.

In addition, the ISDN terminal, which has been notified that B channels for the requested transfer speed can be obtained, can automatically change and perform communication at the requested data transfer speed.

The ISDN switch monitors a period that elapses from the time B channels at the requested data transfer speed were obtained until the communication is switched to the requested data transfer speed. When the switching is not performed within a specific period of time (which can be altered), the obtained B channels, excluding the B channels that are currently being used for communication, can be released.

When the ISDN terminal has been notified that the B channels for the requested data transfer speed have been obtained, and requests the switching be performed at a data transfer speed lower than the requested data transfer speed (a data transfer speed of $H_0$ when requested data transfer speed =$H_1$, and the currently used data transfer speed =64 kbps), the ISDN switch can release the remaining, unused B channels.

Furthermore, when the ISDN terminal has been notified that the B channels for the requested data transfer speed have been obtained, and requests the switching be performed at a data transfer speed lower than the requested data transfer speed (a data transfer speed of $H_0$ when requested data transfer speed =$H_1$, and the currently used data transfer speed =64 kbps), the ISDN switch can release the remaining, unused B channels after a specific time period (which can be changed) has elapsed.

In addition, when the ISDN terminal has been notified that the B channels for the requested data transfer speed have been obtained, and requests the switching be performed at a data transfer speed lower than the requested data transfer speed (a data transfer speed of $H_0$ when requested data transfer speed =$H_1$, and the currently used data transfer speed =64 kbps), the ISDN switch can employ the remaining, unused B channels for another call (e.g., another $H_0$ call).

Further, when a request for transmission at an available data transfer speed (e.g., 64 kbps), together with the requested transfer speed (e.g., $H_1$), is transferred to the ISDN switch, and when the connection is completed at the transmission enabled data transfer speed (e.g., 64 kbps), the ISDN switch employs a new call number to perform transmission at a data transfer speed (e.g., $H_0$) lower than the required speed (e.g., 64 kbps). When the connection has been completed at that speed, the communication speed of the current call (e.g., 64 kbps) is changed to the communication speed of the call (e.g., $H_0$) that is newly connected, and the reservation of the B channels for the switching source call can be continuously monitored by a call that is newly connected by switching.

Figure 5:
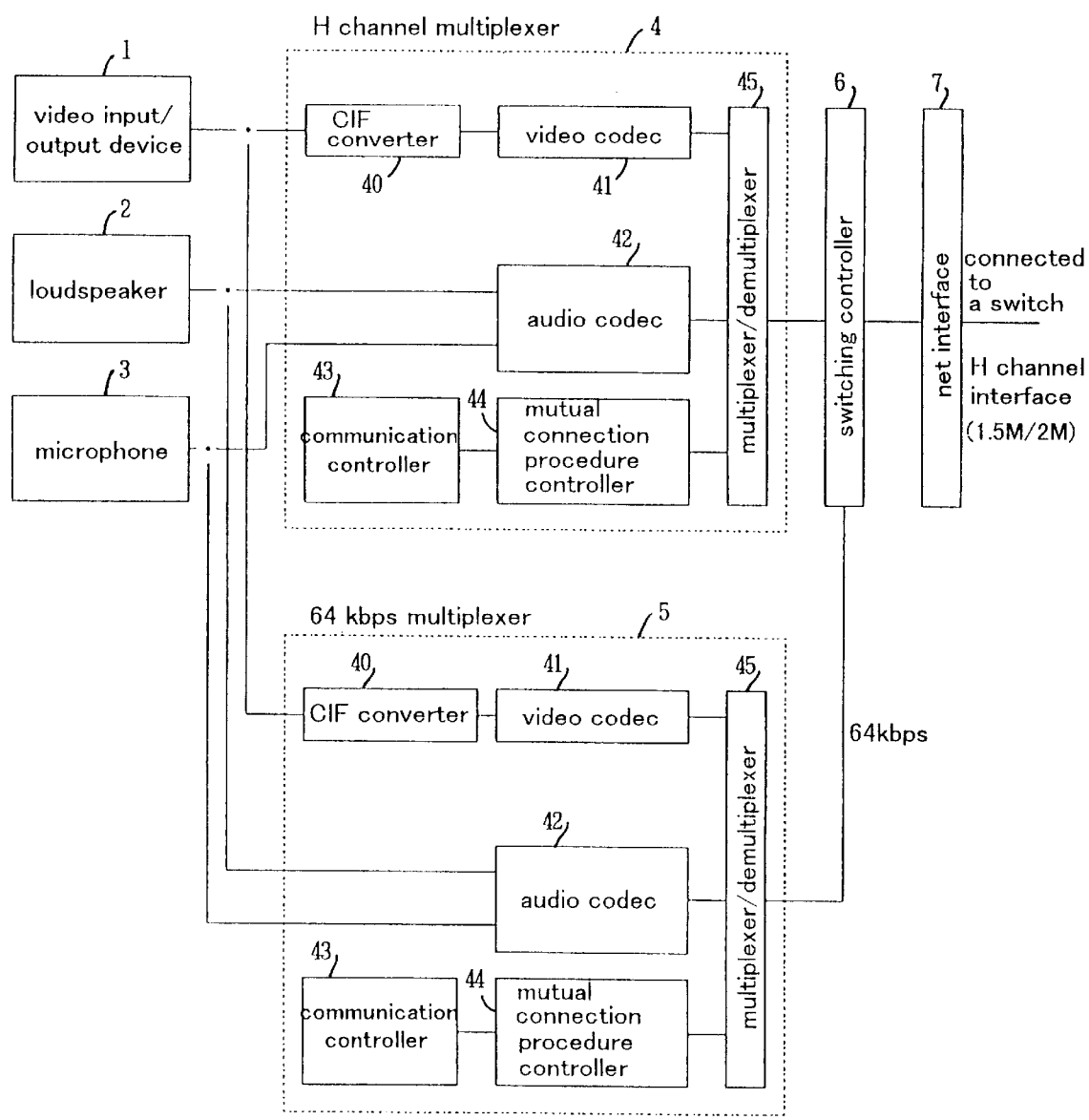
FIG. 5 is a functional block diagram illustrating a videophone that is used as a terminal shown in FIG. 4.

FIG. 5 is a diagram illustrating the arrangement of a video conferencing telephone terminal that is employed as the transmission and reception terminals 150 and 350. A video input/output device 1, a loudspeaker 2, and a microphone 3 are provided as information input/output devices.

An H channel multiplexer 4 and a 64 kbps multiplexer 5, which are video signal processors for the video input/output device 1, each includes: a CIF converter 40; a video signal code 41; an audio code 42 for the loudspeaker 2 and the microphone 3; a communication controller 43 and a mutual connection procedure controller 44 as control function units; and a multiplexer/demultiplexer 45 that are connected to the above described components.

The switching controller 6 selects the output of the H channel multiplexer 4 or of the 64 kbps multiplexer 5, and connects the selected output to the switch via the net interface 7.

Figure 6:
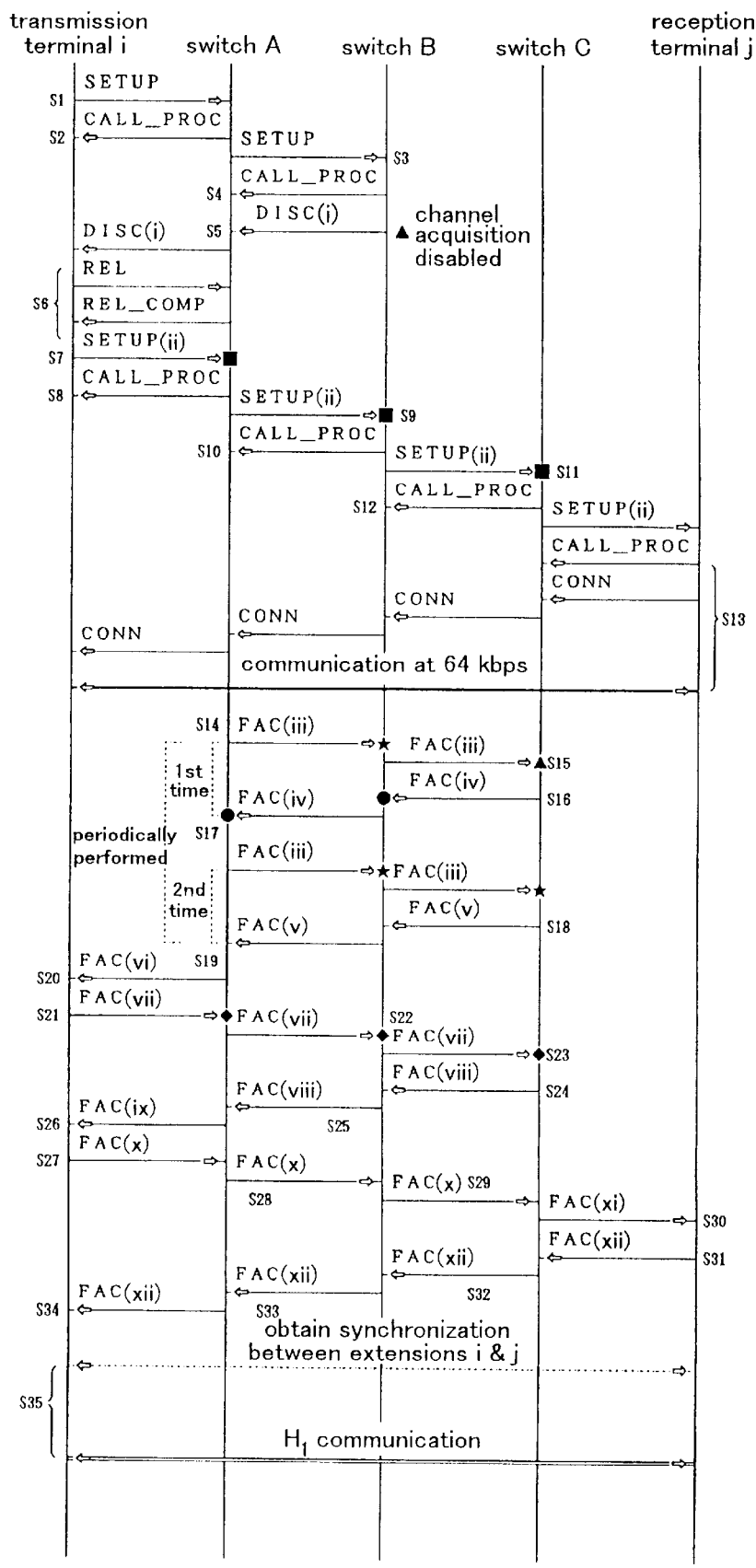
FIG. 6 is a diagram of a message sequence flow according to the present invention.

The present invention will now be explained by referring to a specific embodiment. FIG. 6 is a diagram for explaining a message sequence for carrying out the feature of the present invention that has been explained while referring to FIG. 2. The processing will be described for each condition.

[When Communication is Disabled at a Communication Speed that is Requested at the Time of Transmission]

a: Dialing of the numbers to be transmitted at the $H_1$ communication speed to the extension j is performed at the transmission terminal A of the extension i.

b: The switch A receives a call setup (SETUP) message from the extension i (step S1). The ISDN message analyzer 10 determines the number of channels that must be acquired at the extension i (the number of channels that enable $H_1$ communication). The channel acquisition means 111 of the B channel controller 110 acquires B channels in the extension i based on the determined number of channels requested to be acquired. In the same manner, the B channels for general communication are acquired along the line AB.

c: When the required channels are acquired at the extension i, the switch A that serves as the transmitter 100 employs the ISDN message editor 20 to edit a call setup process (CALL__PROC) message, and transmits the resultant message to the extension i (step S2).

d: When the channels required for the line AB are acquired, the switch A employs the ISDN message editor 20 to edit the SETUP message, and transmits the edited SETUP message to the switch B (step S3).

e: The switch B receives the SETUP message from the switch A, and the ISDN message analyzer 10 determines the number of channels that must be acquired for the line AB (the number of channels required to enable $H_1$ communication). The B channel controller 110 acquires the B channels for the line AB based on the number of channels that it is determined are required. In the same manner, the B channels for the line BC are also acquired.

f: When the switch B has acquired the required number of channels, the ISDN message editor 20 edits the CALL__PROC message and transmits the edited message to the switch A (step S4).

g: When the number of channels required for the line BC can not be acquired, the B channel controller 110 determines a possible communication speed (64 kbps) based on the number of idle channels that are available for the line BC. The ISDN message editor 20 sets #58, which indicates currently unavailable transmission capability, in a data display element to show why the required channels can not be acquired, and also sets an available communication speed in diagnostic data. The ISDN message editor 20 then edits a disconnect (DISC) message and transmits it to the switch A (step S5).

Hereinafter, the release of the channels for the line AB, and the disconnection of a call are performed by a known call disconnection sequence.

h: The switch A receives the DISC message from the switch B, and employs the ISDN message editor 20 to edit the received DISC message that includes data specifying the reason for the occurrence of an event, and transmits the edited message to the extension i. The switch A receives a release (REL) message from the extension i, and edits and transmits it to the switch B (step S6).

Hereinafter, the channels of the extension i and the line AB are released and a call is disconnected by the known release sequence.

[Re-transmission at an Available Communication Speed and a Request of Reservation of Communication at a Required Communication Speed]

a: As a request for an available communication speed 64 kbps and for monitoring channels, the extension i sets a communication speed ($H_1$) for a transmission ability data element in a facility data element in accordance with the conditions that are stored in the re-transmission condition storage section 330. The transmission terminal i re-transmits the thus formed SETUP message (step S7). The edition format for the facility data element is as shown in FIGS. 9 through 12.

In FIG. 9 is shown an example edition format for the facility data elements, which are defined independently in accordance with the following provided operations (note 1):

channel monitoring request
channel reserved transmission
channel reservation disabling notification
channel reservation enabling notification
channel switching notification
channel switching request network channel switching completion notification
communication speed switching completion notification
different call communication speed switching requesting
different call communication speed switching completion notification The contents of an argument differ depending on the above provided operations.

When the provided operation is a "channel monitoring request," a "channel switching enabling notification," a "channel switching request," a "channel switching completion notification," a "communication speed switching request," or a "different call communication speed switching request," the format contents include the argument.

Figure 10:
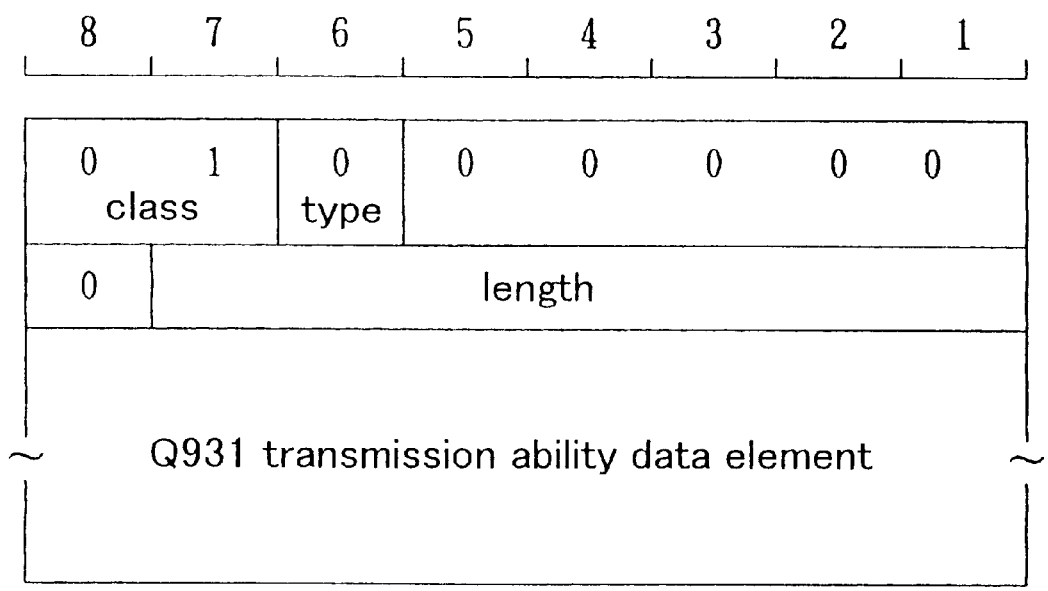
FIG. 10 is a diagram illustrating an example format of operations provided for a "channel monitoring request" and a "channel switching ready notice"
Figure 11:
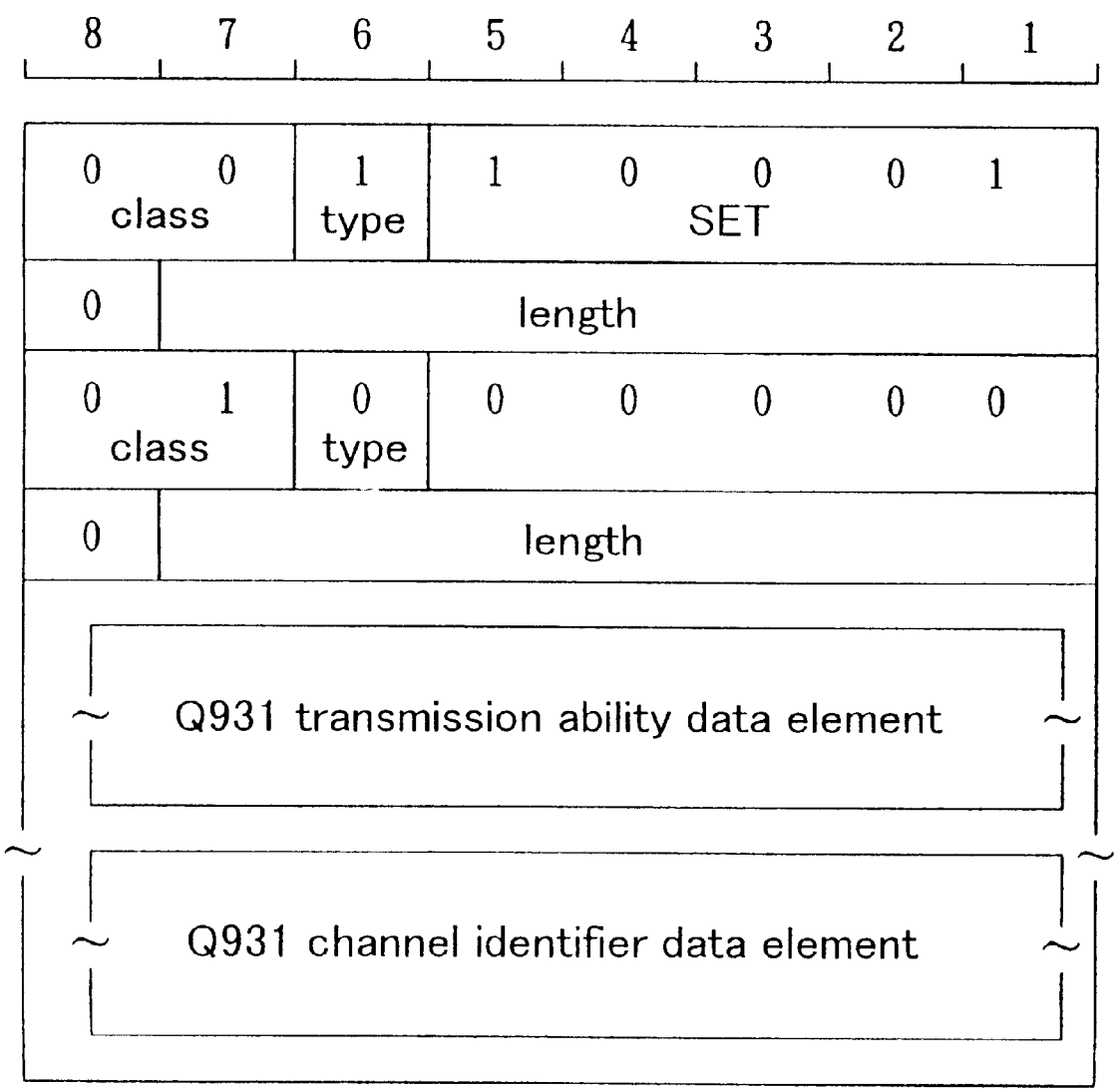
FIG. 11 is a diagram illustrating an example format of operations provided for a "channel monitoring request," a "channel switching ready notice," and a communication speed switching request.
Figure 12:
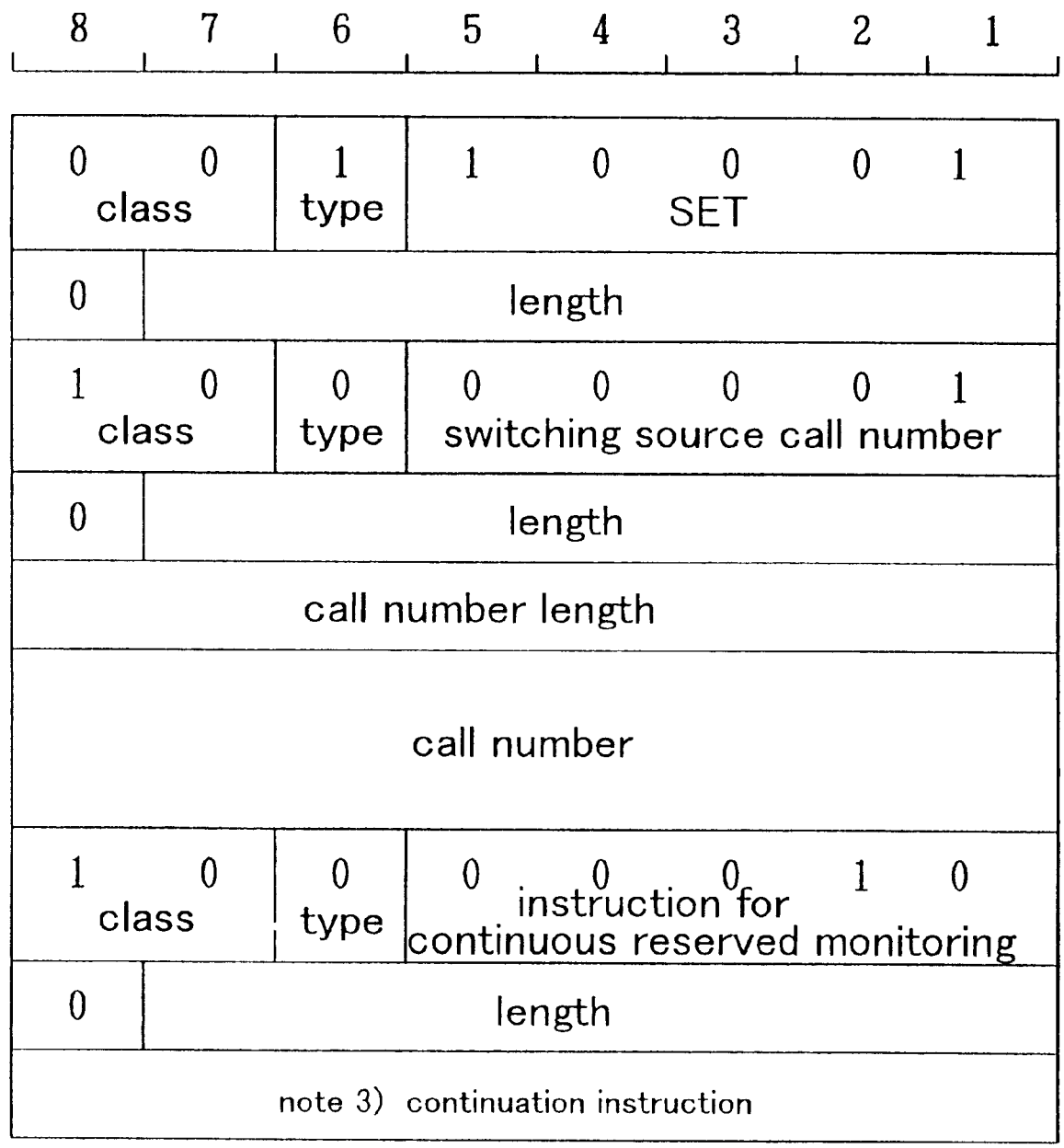
FIG. 12 is a diagram illustrating an example format for an operation provided for a "switching request for a communication speed of a different call."

Example coding for the argument is shown in FIGS. 10 through 12. The example in FIG. 10 is for the operations provided for the "channel monitoring request" and the "channel switching enable notification."

The argument coding example in FIG. 11 is for the operations provided for the "channel switching request" and the "channel switching completion notification."

The example shown in FIG. 12 is for the operation provided for the "different call communication speed switching request." In FIG. 12, an instruction for continuation (note 3) is coded as being either discontinued (0) or continued (1).

b: Referring back to FIG. 6, the switch A receives the SETUP message from the extension i (step S7). The ISDN message analyzer 10 determines the number of B channels that correspond to the available communication speed (64 kbps). When the communication speed of 64 kbps is required, and when the H channel is required for the communication for which channel monitoring is requested, the ISDN message analyzer 10 determines that the B channels to be employed for this communication must be acquired from the H channel shared use class.

The B channel controller 110 acquires the B channels for the extension i from among the B channels in the H channel shared use class. In the same manner, the B channels for the line AB are acquired from among the B channels in the H channel shared use class.

The ISDN message analyzer 10 extracts a data transfer speed from the transmission ability data element of the facility data elements. Further, the necessary number of B channels ($H_1$) is determined. For the extension i and the line AB, sequential B channels, including the acquired B channels, the number of which is adequate for $H_1$ communication, are changed from the H channel shared use class to the H channel dedicated class by the channel class change section 30. The B channels whose class is changed are set to the channel class change storage section 31. Also, data indicating that reserved transmission is required is entered in a reserved transmission area of the channel class change storage section 31.

c: When the required number of channels are acquired for the extension i, the ISDN message editor 20 in the switch A edits the CALL_PROC message and transmits the edited message to the extension i (step S8).

d: When the switch has acquired the required number of channels for the line AB, the ISDN message editor 20 includes in the SETUP message the required communication speed ($H_1$), as a channel monitoring request, as well as the SETUP message that is received from the extension i. The edited SETUP message is transmitted to the switch B (step S9).

e: Upon the receipt of the SETUP message from the switch A, the switch B employs the ISDN message analyzer 10 to determine the number of B channels that corresponds to the available communication speed (64 kbps). The B channel controller 110 acquires the B channels for the line AB from among those in the H channel shared use class. In the same manner, the B channels for the line BC are acquired from those in the H channel dedicated class.

The ISDN message analyzer 10 extracts the data transfer speed from the transmission ability data element (see FIG. 10) of the facility data elements and determines the required number of B channels ($H_1$). For each of the lines AB and BC, the sequential B channels, including the acquired B channels, the number of which is sufficient for $H_1$ communication, are changed from the H channel shared use class to the H channel dedicated class by the channel class change section 30. Then, the B channels whose class was changed are stored in the channel class change storage section 31.

f: When the switch B has acquired the required B channels for the line AB, the ISDN message editor 20 edits the CALL_PROC message and transmits the edited message to the switch A (step S10).

g: When the switch B has acquired the required B channels for the line BC, the ISDN message editor 20 includes in the SETUP message the necessary communication speed ($H_1$), as a channel monitoring request, as well as the SETUP message that is received from the switch A. The resultant SETUP message is transmitted to the switch C (step S11).

h: Upon receipt of the SETUP message from the switch B, the switch C employs the ISDN message analyzer 10 to determine the number of B channels that correspond to the available communication speed (64 kbps). The B channel controller 110 acquires the B channels for the line BC from among those in the H channel shared use class.

In the same manner, the B channels for the extension j are acquired from among the B channels in the H channel shared use class.

The ISDN message analyzer 10 extracts the data transfer speed from the transmission ability data element of the facility data elements, and determines the required number of B channels ($H_1$). For both the line BC and the extension j, sequential B channels, including the acquired B channels, in a number that is adequate for performing $H_1$ communication, are changed from the H channel shared used class to the H channel dedicated class by the channel class change section 30. The B channels whose class is changed are stored in the channel class change storage section 31.

i: When the switch C has acquired the required number of B channels for the line BC, the ISDN message editor 20 edits the CALL_PROC message and transmits the edited message to the switch B (step S12).

j: When the switch C has acquired the required number of B channels for the extension j, the ISDN message editor 20 edits the SETUP message for the extension j, and transmits it to the extension j.

k: Hereinafter, according to the known call setting procedures, a response (CONN) message is transmitted from the extension j, via the switches A, B and C, to the extension i, so that both extensions i and j are in communication (step S13).

[Monitoring of Channels when Idle, and Monitoring and Acquisition of Reserved Channels]

a: In the switch A, the reserved transmission section 40 is activated for a specified time. When data that indicate reserved transmission is required are present in the reserved transmission area of the channel class change storage section 31 on the extension i and the line AB side, the B channel controller 110 temporarily acquires, for reservation, the B channels that are stored in the storage section 31, excluding those that are already acquired.

When the B channels are acquired for the extension i and the line AB, the ISDN message editor 20 includes the channel reserved transmission code in the facility data element of a facility (FAC) message. The resultant message is then transmitted to the switch B (step S14).

b: Upon receipt of the FAC message from the switch A, the switch B employs the ISDN message analyzer 10 to analyze the message. For reservation, the B channel controller 110 temporarily acquires the B channels for the lines AB and BC that are stored in the channel class change storage section 31, excluding the already acquired B channels.

When the B channels for the lines AB and BC have been acquired, the ISDN message editor 20 includes the channel reserved transmission data in the facility data element of the FAC message. The resultant message is transmitted to the switch C (step S15).

c: Upon receipt of the FAC message from the switch B, the switch C employs the ISDN message analyzer 10 to analyze the message. For reservation, the B channel controller 110 temporarily acquires the B channels for the lines BC and the extension j that are stored in the channel class change storage section 31, excluding the already acquired B channels.

When the B channels for the lines BC and the extension j have not been acquired, the ISDN message editor 20 includes the channel reserve disable data in the facility data element of the FAC message. The resultant message is transmitted to the switch B (step S16).

d: Upon receipt of the FAC message from the switch C, the switch B employs the ISDN message analyzer 10 to analyze the message. When the message indicates channel reservation is disabled, the B channel controller 110 releases the B channels that, from among those stored in the channel class change storage section 31, were acquired for reservation.

The ISDN message editor 20 includes the channel reservation disable data in the facility data element of the FAC message. The resultant message is transmitted to the switch A (step S17).

e: Upon receipt of the FAC message from the switch B, the switch A employs the ISDN message analyzer 10 to analyze the message. When the message indicates that the channel reservation is disabled, the B channel controller 110 releases the B channels that, from among those stored in the channel class change storage section 31, were acquired for reservation.

f: When the reserved transmission section 40 is activated in the following cycle, the channel reservation data is transmitted in accordance with the above described procedures a and b. When the B channels for the line BC and extension j can be acquired, the ISDN message editor 20 of the switch C includes the channel reserve enable data in the facility data element of the FAC message (step S18).

g: Upon receipt of the FAC message from the switch C, the switch B employs the ISDN message analyzer 10 to analyze the message. When the message indicates channel reservation is enabled, the ISDN message editor 20 includes the channel reservation enable in the facility data element of the FAC message. The resultant message is transmitted to the switch A (step S19).

h: Upon receipt of the FAC message from the switch B, the switch A employs the ISDN message analyzer 10 to analyze the message. When the message indicates channel reservation is enabled, the ISDN message editor 20 sets in the FAC message the requested data transfer speed ($H_1$), which is now available, in the transmission ability data element of the facility data elements. The resultant message is transmitted to the extension i as a notice that indicates channel switching is permitted (step S20).

[Switching to a Reserved Channel]

a: When the extension i has received an FAC message from the switch A, the ISDN message analyzer 210 extracts an available data transfer speed ($H_1$) from the transmission ability data in the facility data elements. The extracted data transfer speed is displayed on the terminal state display 310 to set the channel switching wait condition.

The terminal operation analyzer 260 receives a channel switching operation entered by a user at the terminal operation data notification section 320. When the request from the user for channel switching is accepted, the ISDN message editor 220 includes a data transfer speed for which a change is requested, as a transmission ability data element of the facility data elements of an FAC message, and includes B channels for which a change is requested, as channel identifier data elements. The edited message is transmitted as the channel switching request to the switch A (step S21).

b: Upon receipt of the FAC message from the extension i, the ISDN message analyzer 10 of the switch A connects the paths of the B channels for the extension i and for the line AB, which are stored in the channel class storage section 31 and which are temporarily acquired and reserved. The channel class for the B channels whose paths are connected is restored to the H channel shared use class by the channel class change section 30.

The ISDN message editor 20 edits the same data as the FAC message received by the extension i, and transmits the edited message to the switch B (step S22).

c: Upon receipt of the FAC message from the switch A, the ISDN message analyzer 10 of the switch B connects the paths of the B channels for the line AB and for the line BC, which are stored in the channel class storage section 31 and are temporarily acquired and reserved. The channel class for the B channels whose paths are connected is returned to the H channel shared use class by the channel class change section 30.

The ISDN message editor 20 edits the same data as the FAC message that is received by the switch A, and transmits the edited message to the switch C (step S23).

d: Upon receipt of the FAC message from the switch B, the ISDN message analyzer 10 of the switch C connects the paths of the B channels for the line BC and for the extension j, which are stored in the channel class storage section 31 and are temporarily acquired and reserved. The channel class for the B channels whose paths are connected is returned to the H channel shared use class by the channel class change section 30.

The ISDN message editor 20 includes network channel switching completion in the facility data element in the FAC message (see FIG. 9), and transmits to the switch B the edited message as a notification indicating that the channel switching in the network has been completed(step S24).

e: Upon receipt of the FAC message from the switch C, the ISDN message editor 20 of the switch C edits the FAC message that includes the same message as the FAC message from the switch C, and transmits the FAC message to the switch A (step S25).

f: Upon receipt of the FAC message from the switch B, the ISDN message editor 20 of the switch A edits the facility data elements of the FAC message: a communication speed ($H_1$) that is switched is included in the transmission ability data element; and B channel numbers, for which channel switching is to be performed, and a network channel switching completion notice are included in the channel identifier data element.

The resultant FAC message is then edited and transmitted to the extension i (step S26).

g: Upon receipt of the FAC message from the switch A, the channel switching controller 230 of the extension i extracts the transmission ability data element and the channel identifier data element from among the facility data elements, and displays the data transfer speed, which is the transmission ability data element, on the terminal state display 310. The available data transfer speed ($H_1$) is displayed in the display section of the terminal, and the terminal is set to the channel switching operation waiting state.

The terminal operation analyzer 260 receives a channel switching operation entered by a user at the terminal operation data notification section 320, and identifies the request by the user for channel switching. In order to request that the extension j switch the communication speed, the ISDN message editor 220 edits the facility data elements of the FAC message; the data transfer speed (H1) to be switched is included in the transmission ability data element; and B channel numbers, for which switching is requested, and a communication speed switching request are included in the channel identifier data element. The resultant FAC message is transmitted to the switch A (step S27).

h: Upon receipt of the FAC message from the extension i, the ISDN message editor 20 of the switch A edits the FAC message that includes the same message as the FAC message from the extension i, and transmits the FAC message to the switch B (step S28).

i: Upon receipt of the FAC message from the switch A, the ISDN message editor 20 of the switch B edits the FAC message that includes the same message as the FAC message from the switch A, and transmits the FAC message to the switch C (step S29).

j: Upon receipt of the FAC message from the switch B, the ISDN message editor 20 of the switch C edits the facility data elements of the FAC message in order to request that the extension i change the communication speed, i.e., an available data transfer speed ($H_1$) is included in the transmission ability data element, and B channel numbers, including those of the B channels that are currently employed for communication, for which switching is requested, are included in the channel identifier data element. The resultant FAC message is transmitted to the extension j (step S30).

k: Upon receipt of the FAC message from the switch C, the ISDN message analyzer 210 of the extension j extracts the transmission ability data element and the channel identifier data element from among the facility data elements, and displays the data transfer speed, which is the transmission ability data element, on the terminal state display 310. The available data transfer speed ($H_1$) is displayed in the display section of the terminal. The channel switching controller 230 disconnects the path between the 64 kbps multiplexer 352, of the switching controller 351, that multiplexes audio and an image at 64 kbps, and the B channels, which are currently employed for communication. The channel switching controller 230 connects the H channel multiplexer 353, which multiplexes audio and an image at $H_1$, to the B channels, which are currently employed for communication along a path running between them, and also connects the B channels that are acquired by the switch C along the path between them. The state of the terminal is therefore set to the synchronized communication wait state.

The ISDN message editor 220 edits the FAC message so that it includes the communication speed switching completion in the facility data element of the FAC message, and transmits to the switch C the resultant FAC message as notification that the communication speed has been changed (step S31).

l: Upon receipt of the FAC message from the extension j, the ISDN message editor 20 of the switch C edits the FAC message that includes the same message as the FAC message from the extension j, and transmits the FAC message to the switch B (step S32).

m: Upon receipt of the FAC message from the switch C, the ISDN message editor 20 of the switch B edits the FAC message that includes the same message as the FAC message from the switch C, and transmits the FAC message to the switch A (step S33).

n: Upon receipt of the FAC message from the switch B, the ISDN message editor 20 of the switch A edits the FAC message that includes the same message as the FAC message from the switch B, and transmits the FAC message to the extension i (step S34).

o: Upon receipt of the FAC message from the switch A, the channel switching controller 230 of the extension i disconnects the 64 kbps multiplexer 152, of the switching controller 151, that multiplexes audio and an image at 64 kbps, and the B channels, which are currently employed for communication, that are connected along the path that runs between them. The channel switching controller 230 connects the H channel multiplexer 153, which multiplexes audio and an image at $H_1$, to the B channels, which are currently employed for communication, along a path that runs between them, and also connects the extension i to the B channels that are acquired by the switch A, along a path that runs to them.

p: Hereinafter, following the conventional procedures for data communication between terminals, between the extensions i and j communication is synchronized for the exchange of data between them (step S35).

The explanatory notes for symbols that are employed in FIG. 6 are as follows.

▲: Acquisition of line between switches B and C disable

■: Change to H channel dedicated class

★: Check on presence of idle channels (when all channels are idle, they are acquired and temporarily reserved.)

●: Release temporarily acquired channels

◆: Set paths of acquired channels on transmission and reception sides, and change H channel shared use class DISC(i): Notification that acquisition of channels adequate for communication speed is disabled SETUP(ii): Re-transmission (64k) after speed conversion in association with channel monitoring FAC(iii): Channel reservation transmission (Checking and temporary reservation of idle channels)

FAC(iv): Channel reservation response (notification that channel reservation is disabled)

FAC(v): Channel reservation response (notification that channel reservation is enabled)

FAC(vi): Channel switching enable notice (notification of available data transfer speed and B channels)

FAC(vii): Channel switching request (notification of data transfer speed and B channels to be used)

FAC(viii): Network channel switching completion notification

FAC(ix): Network channel switching completion notice (notification of changed data transfer speed and B channels)

FAC(x): Communication speed switching request

FAC(x1): Communication speed switching request (data transfer speed and B channels to be switched)

FAC(x2): communication speed switching completion notification

[Processing for Issuing an Automatic Channel Switching Request from Extension i]

While referring to FIGS. 1 through 6, an explanation will now be given for example processing whereby the extension i automatically issues a channel switching request when it receives a notice from the switch A that channel switching is available for use.

a: When a user selects a channel switching mode at the extension i, the terminal operation analyzer 260 receives notification that the user has selected the channel switching mode from the terminal operation data notification section 320. The terminal operation analyzer 250 affirms that the user has selected the channel switching mode, and reads the current channel switching mode from the channel switching mode storage section 270. When the channel switching mode is a manual switching mode, the automatic switching mode is set in the channel switching mode storage section 270. When the channel switching mode is the automatic switching mode, the manual switching mode is set in the channel switching mode storage section 270. At the same time, the channel switching mode that has been newly set is displayed in the display section of the terminal.

b: The extension i receives, from the switch A, the FAC message, including a channel switching enable notice, when a data transfer speed that can be switched is set in the transmission ability data element in the facility data element. The ISDN message analyzer 210 extracts the changeable data transfer speed from he transmission ability data element in the facility data elements, and sets the changeable communication speed in the terminal state display 310.

c: The ISDN message analyzer 210 reads the channel switching mode from the channel switching mode storage section 270. When the switching mode is the automatic mode, the ISDN message editor 220 edits the facility data elements of the FAC message, so that the data transfer speed for which a change is requested is included in the transmission ability data element, and B channel numbers for which switching is requested is included in the channel identifier data element. The resultant FAC message is transmitted to the switch A.

d: Hereinafter, the procedure at b and the following steps in [Switching to a reserved channel] are performed to switch the channels.

[Processing for Issuing an Automatic Channel Switching Request Following the Expiration of a Specific Time]

In the same manner, while referring to FIGS. 1 and 6, an explanation will now be given for example processing whereby, when the extension i receives a notice from the switch A that channel switching is available for use, an automatic channel switching request is issued following the expiration of a specific time even though the switching operation is not performed at the extension i.

a: When a user selects a channel switching mode at the extension i, the terminal operation analyzer 260 receives notification that the user selected the channel switching mode from the terminal operation data notification section 320. The terminal operation analyzer 250 affirms that the user has selected a channel switching mode, and reads the current channel switching mode from the channel switching mode storage section 270. When the channel switching mode is a manual switching mode, the automatic switching mode is set in the channel switching mode storage section 270. When the channel switching mode is the automatic switching mode, the manual switching mode is set in the channel switching mode storage section 270. At the same time, the channel switching mode that has been newly set is displayed in the display section of the terminal.

b: The extension i receives, from the switch A, the FAC message including a channel switching enable notification when a data transfer speed that can be switched is set in the transmission ability data element in the facility data element. The ISDN message analyzer 210 extracts the changeable data transfer speed from he transmission ability data element in the facility data elements, and sets the changeable communication speed in the terminal state display 310.

c: The ISDN message analyzer 210 reads the channel switching mode from the channel switching mode storage section 270. When the switching mode is the manual mode, a permissible time that elapses before the channel switching is performed by the operation at the extension i is extracted from the permissible monitoring time storage area in the channel switching request time manager 241. The permissible time is set in the monitoring time storage area in the channel switching request time manager 241.

d: The channel switching monitor 240 in the extension i decrements, for each second, the time that is set in the monitoring time storage area in the channel switching request time manager 241. When the count reaches "0", the ISDN message editor 220 edits the FAC message, so that a data transfer speed for which switching is requested is included in the transmission ability data element of the facility data elements, and B channel numbers for which switching is requested are included in the channel identifier data element. The resultant FAC message is transmitted as a channel switching request to the switch A.

e: Hereinafter, the procedure at b and the following steps in [Switching to a reserved channel] are performed to switch the channels.

[Canceling for Reservation of Channels When Channel Switching is not Performed at Extension i (1)]

An explanation will now be given for processing whereby reservation of channels is canceled when a channel switching request is not issued from the extension i while the extensions i and j are in communication across channels operating at 64 kbps, even though as in FIG. 1 the extension i has received, from the switch A, a notice that channel switching is available. The processing for canceling the channel reservation will be described while referring to a message sequence shown in FIG. 7.

a: The switch A transmits to the extension i a notice that channel switching is enabled (step S40). For transmission of this notice, the time that elapses before channels are switched, which is registered in the system in advance by the ISDN message editor 20, is extracted from the channel switching allowable time storage section 61. The extracted time is set in the channel class change storage section 31.

b: The channel switching monitor 60 of the switch A decrements each second the time that is set in the channel class change storage section 31. When the count reaches "0" (step S41), the channel class of the B channels that is stored in the channel class change storage section 31 is restored to the H channel shared use class by the channel class change section 30. Then, the B channel controller 110 releases only those of the B channels that are reserved.

c: At this time, the ISDN message editor 20 of the switch A edits the FAC message, so that it includes a reserved channel release request in its facility data elements. The FAC message is thereafter transmitted as a reserved B channel release notice to the switch B (step S42).

d: The switch B receives the FAC message from the switch A. The channel class of the B channels that are stored in the channel class change storage section 31 is returned to the H channel shared use class by the channel class change section 30. The B channel controller 110 releases the B channels other than those that are currently being used for communication.

e: At the switch B. the ISDN message editor 20 includes the reserved channel release request in the facility data elements of the FAC message. The FAC message is transmitted as a B channel release notice to the switch C (step S43).

f: The switch C receives the FAC message from the switch B. The channel class of the B channels that are stored in the channel class change storage section 31 is restored to the H channel shared use class by the channel class change section 30. The B channel controller 110 releases the B channels other than those that are currently being used for communication.

Figure 7:
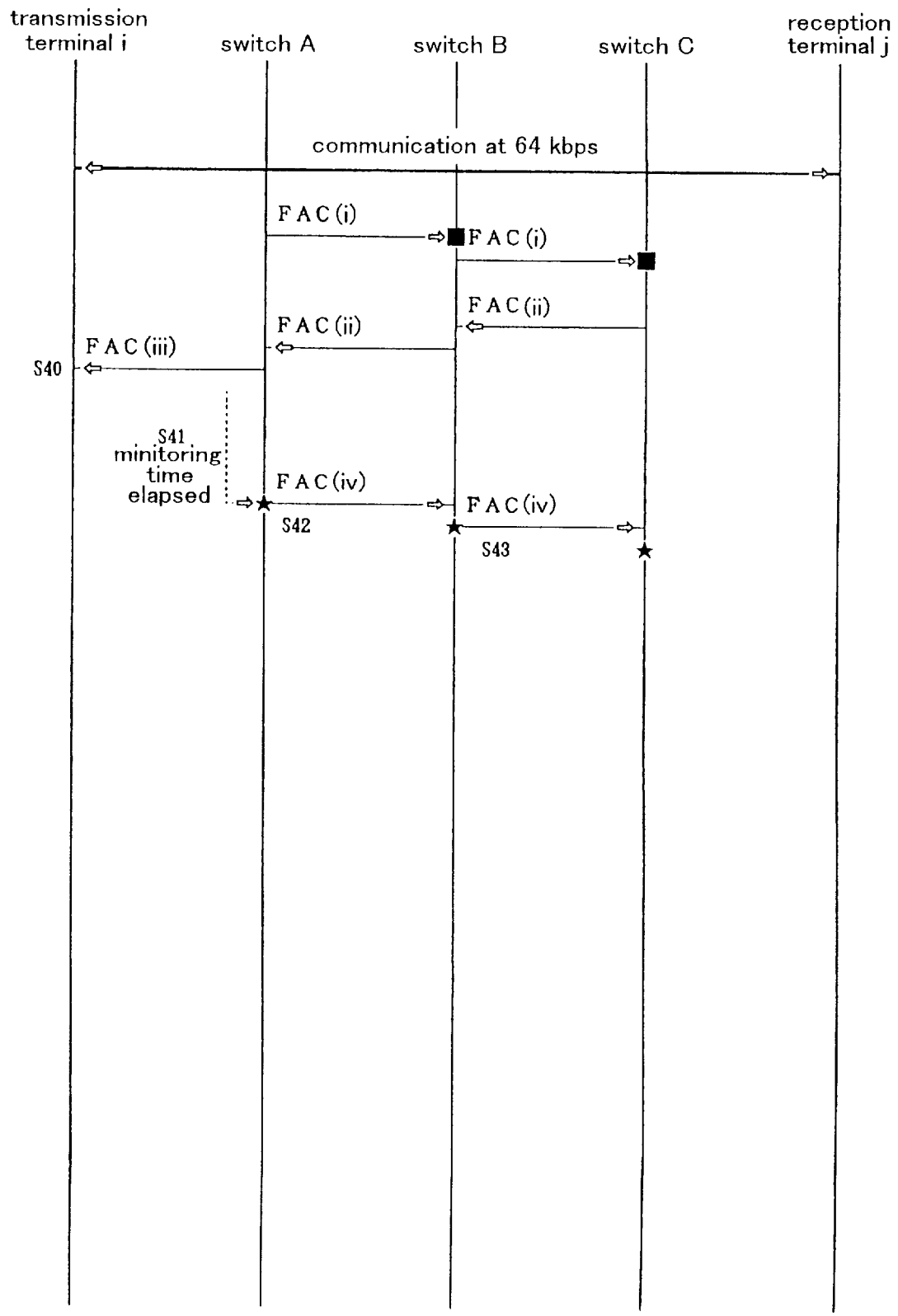
FIG. 7 is a diagram of a message sequence flow of the present invention for releasing a reserved channel.

The explanatory notes for symbols that are employed for the sequence in FIG. 7 are as follows.

■: Monitor idle channels and temporarily reserve channels

★: Release temporarily reserved channels

FAC(i): Channel reservation transmission (Checking and temporarily reservation of idle channels)

FAC(ii): Channel reservation response (notification that channel reservation is enabled)

FAC(iii): Channel switching enable notice (notification that available data transfer speed and B channels)

FAC(iv): Reserved channel release notice

[Processing for Canceling Reservations of Unused B Channels]

While referring to FIGS. 1 and 6, an explanation will now be given for processing when reservation of unused B channels is canceled after the switch A has received a channel switching request from the extension i, and when the number of B channels for which switching is requested is fewer than the number of B channels that are reserved at the switch A.

a: The switch A receives from the extension i an FAC message, as a channel switching request, in which a data transfer speed, at which switching is requested, is included in the transmission data element of the facility data elements, and B channel numbers for which switching is requested are included in the channel identifier data element (step S27).

The ISDN message analyzer 10 extracts the requested B channel numbers from the channel identifier data element of the facility data elements, and connects these B channels to the reserved B channels along a path between them. In this manner, the number of B channels that are reserved by the switch A is compared with the number of the B channels for which switching is requested.

When unused B channels are present along the reserved B channels, the channel class of the unused B channels is returned to the H shared use class by the channel class change means 30. At the same time, the B channel controller 110 releases the unused B channels.

b: The switches B and C release unused B channels in the same manner as the switch A.

[Canceling reservation of channels when channel switching is not performed at extension i (2)]

An explanation will be given for the processing performed when reservation of channels is canceled under the same conditions were those in the channel reservation canceling process (1), in the event a channel switching request is not issued from the extension i.

a: The switch A receives from the extension i an FAC message, as a channel switching request, in which a data transfer speed, at which switching is requested, is included in the transmission data element of the facility data elements, and B channel numbers for which switching is requested, are included in the channel identifier data element (step S27).

The ISDN message analyzer 10 extracts the requested B channel numbers from the channel identifier data element of the facility data elements, and connects these B channels to the reserved B channels along a path between them. In this manner, the number of B channels that are reserved by the switch A is compared with the number of the B channels for which switching is requested. When unused B channels are present among the reserved B channels, the time that will elapse before unused reserved B channels are released, which is registered in advance to the system, is extracted from the unused channel permissible holding time storage section 71. The extracted time is set in the channel class change storage section 31.

b: The unused channel holding monitor 70 of the switch A decrements each second the time that is set to the channel class change storage section 31. When the count reaches "0", the channel class of the unused B channels is restored to the H channel shared use class by the channel class change section 30. Then, of those B channels, the B channel controller 110 releases only the B channels that are reserved.

c: The switches B and C release unused B channels in the same manner as the switch A.

[Reserved Transmission Process for Requesting Acquisition of Reserved B Channels]

An explanation will now be given for the processing performed when the extension i has received, from the switch A, a CONN message indicating a line is connected at 64 kbps, and reserved transmission for requesting acquisition of reserved B channels is forwarded from the extension i to the switch A at specific time intervals.

a: When the user at the extension i selects a reserved transmission mode, the terminal operation analyzer 260 is notified of the reserved transmission mode change by the terminal operation data notification section 320. The terminal operation analyzer affirms the reserved transmission mode change, and reads a current reserved transmission mode from the reserved transmission mode storage section 280.

b: At the extension i, the ISDN message editor 220 edits the SETUP message, so that an available communication speed (64 kbps) and a communication speed ($H_1$) that is necessary for channel monitoring are included in the transmission ability data element in the facility data elements. The SETUP message is then transmitted to the switch A. When the reserved transmission mode stored in the reserved transmission storage section 280 indicates a reserved transmission, the necessary communication speed is set in the speed storage area in the reserved transmission data storage section 290.

c: The extension i receives the CONN message from the switch A. As a result of message analysis by the ISDN message analyzer 210, when the reserved transmission mode in the reserved transmission mode storage section 280 indicates a reserved transmission, the reserved transmission request is stored in the reserved transmission request area in the reserved transmission storage section 290.

d: The reserved transmission controller 250 of the extension is activated at specified times to extract the contents of the reserved transmission request area in the reserved transmission data storage section 290. When the contents of the reserved transmission request area indicate a reserved transmission request, the ISDN message editor 220 includes channel reserved transmission data in the facility data elements of the FAC message. The edited FAC message is thereafter transmitted to the switch A.

e: Upon receipt of the FAC message from the extension i, the ISDN message analyzer 10 of the switch A analyzes the FAC message. The B channel controller 110 temporarily acquires the B channels, for the extension i and for the line AB, the B channels, excluding the previously acquired B channels, that are stored in the channel class change storage section 31. No requirement of a reserved transmission is set in the reserved transmission area in the channel class change storage section 31.

When the B channels for the extension i and the line AB are acquired, the ISDN message editor 20 includes the channel reserved transmission in the facility data elements of the FAC message. The edited FAC message is transmitted to the switch B (step S14).

f: Upon receipt of the FAC message from the switch A, the ISDN message analyzer 10 at the switch B analyzes the FAC message. The B channel controller 110 temporarily acquires, for the line AB and for the line BC, the B channels, excluding the previously acquired B channels, that are stored in the channel class change storage section 31.

When the B channels for the line AB and the line BC are acquired, the ISDN message editor 20 includes the channel reserved transmission in the facility data elements of the FAC message. The edited FAC message is transmitted to the switch C (step S15).

g: Upon receipt of the FAC message from the switch B, the ISDN message analyzer 10 at the switch C analyzes the FAC message. The B channel controller 110 temporarily acquires, for the line BC and for the extension j, the B channels, excluding the previously acquired B channels, that are stored in the channel class change storage section 31.

When the B channels for the line AB and the extension j are acquired, the ISDN message editor 20 includes channel reserved enable data in the facility data elements of the FAC message. The edited FAC message is transmitted to the switch B (step S18).

h: Upon receipt of the FAC message from the switch C, the ISDN message analyzer 10 at the switch B analyzes the received FAC message. When the reservation of channels is enabled, the ISDN message editor 20 includes the channel reserved enable data in the facility data elements of the FAC message. The edited FAC message is transmitted to the switch A (step S19).

i: Upon receipt of the FAC message from the switch B, the ISDN message analyzer 10 at the switch A analyzes the received FAC message. When the reservation of channels is enabled, the ISDN message editor 20 edits the FAC message, so that the required data transfer speed that is now available is included in the transmission ability data element of the facility data elements of the FAC message. The edited FAC message is transmitted to the extension i (step S20).

[Processing for Canceling the Reservation of $H_1$ from the Extension i]

An explanation will now be given for the processing that is performed when the extension i cancels reserved $H_1$ communication during communication at 64 kbps and under the conditions are such that the B channels for the $H_1$ communication are reserved and monitored.

a: When the user at the extension i performs an operation for canceling a reserved transmission, the terminal operation analyzer 260 is notified of the action taken by the user by the terminal operation data notification section 320. The terminal operation analyzer 260 affirms the cancellation of the reserved transmission. The ISDN message editor 220 edits the FAC message so that the reserved channel cancellation notice is included in the facility data elements. The edited FAC message is transmitted to the switch A.

b: Upon the receipt of the FAC message from the extension i, the ISDN message analyzer 10 at the switch A analyzes the message, and determines whether or not the B channels, other than the currently employed B channels, that are stored in the channel class change storage section 31 for the extension i and the line AB have been temporarily reserved and acquired. If the B channels have been temporarily reserved and acquired, the B channel controller 110 cancels their reserved status, and the channel class change section 30 restores the channel class of all of the B channels, which are stored in the channel class change storage section 31, to the H channel shared use class.

The ISDN message editor 20 edits the FAC message so that it includes a reserved channel cancel notice in the facility data elements. The edited FAC message is transmitted to the switch B.

c: Upon the receipt of the FAC message from the switch A, the ISDN message analyzer 10 at the switch B analyzes the message, and determines whether or not the B channels, other than the currently employed B channels, that are stored in the channel class change storage section 31 for the line AB and for the line BC have been temporarily reserved and acquired. If the B channels have been temporarily reserved and acquired, the B channel controller 110 cancels their reserved status, and the channel class change section 30 restores the channel class of all of the B channels, which are stored in the channel class change storage section 31, to the H channel shared use class.

The ISDN message editor 20 edits the FAC message so that it includes a reserved channel cancel notice in the facility data elements. The edited FAC message is transmitted to the switch C.

d: Upon the receipt of the FAC message from the switch B, the ISDN message analyzer 10 at the switch C analyzes the message, and determines whether or not the B channels, other than the currently employed B channels, that are stored in the channel class change storage section 31 for the line BC and for the extension j have been temporarily reserved and acquired. If the B channels have been temporarily reserved and acquired, the B channel controller 110 cancels their reserved status, and the channel class change section 30 restores the channel class of all of the B channels, which are stored in the channel class change storage section 31, to the H channel shared use class.

[Processing for Changing the Communication Speed for a Call from 64 kbps to $H_0$ by Operation of Extension i]

An explanation will now be given for the processing whereby, under the conditions where the extension i is connected at 64 kbps and the reservation of the B channels for $H_1$ communication is monitored, when a call from the extension i at 64 kbps is maintained and another call is transmitted at $H_0$ and is connected via the B channels, whose channel class has been changed to the H channel dedicated class by the current call at 64 kbps, the communication speed for the call is changed from 64 kbps to $H_0$ by operation of the extension i.

The switching of the communication speed will be described while referring to a message sequence shown in FIG. 8.

a: When the user operates the extension i to change the communication speed of a different call, the terminal operation analyzer 260 is notified of the action taken by the user by the terminal operation data notification section 320. The terminal operation analyzer 260 affirms the request for changing the communication speed for a different call. In order to transmit to the switch the request for changing a communication speed for a different call, the ISDN message editor 220 sets a call number for a call of 64 kbps in the facility data element of an FAC message.

Further, monitoring of the reserved status of the switching source call (a call at 64 kbps) is changed to instruct continued reserved monitoring of a switching destination call (a call at $H_0$). Then, the FAC message is edited, so that it includes a request for switching a communication speed for a different call, and is transmitted to the switch A (step S50).

b: Upon the receipt of the FAC message from the extension i, the ISDN message analyzer of the switch A extracts the reservation monitor instruction from the facility data element of the FAC message. When the continuous reserved monitoring is instructed, a call number is extracted from the facility data element. All the B channels, which are stored in the channel class change storage section 31 that corresponds to the call number (call at 64 kbps), and the requirement/non-requirement of the reserved transmission are set in the channel class change storage section 31 that corresponds to a $H_0$ call. The B channels are deleted from the channel change class storage section 31 that corresponds to the call number (call of 64 kbps).

The ISDN message editor 20 edits the FAC message so that it includes the same data as does the FAC message received from the extension i. The edited FAC message is transmitted to the switch B (step S51).

c: Upon the receipt of the FAC message from the switch A, the ISDN message analyzer at the switch B extracts the reservation monitor instruction from the facility data element of the FAC message. When continuous reserved monitoring is instructed, a call number is extracted from the facility data element. All the B channels, which are stored in the channel class change storage section 31 that corresponds to the call number (a call at 64 kbps), and the requirement/non-requirement of the reserved transmission are set in the channel class change storage section 31 that corresponds to an $H_0$ call. The B channels are deleted from the channel change class storage section 31 that corresponds to the call number (a call at 64 kbps).

The ISDN message editor 20 edits the FAC message so that it includes the same data as does the FAC message received from the switch A. The edited FAC message is transmitted to the switch C (step S52).

d: Upon the receipt of the FAC message from the switch B, the ISDN message analyzer of the switch C extracts the reservation monitor instruction from the facility data element of the FAC message. When continuous reserved monitoring is instructed, a call number is extracted from the facility data element. All the B channels, which are stored in the channel class change storage section 31 that corresponds to the call number (a call at 64 kbps), and the requirement/non-requirement for the reserved transmission are set in the channel class change storage section 31 that corresponds to an $H_0$ call. The B channels are deleted from the channel change class storage section 31 that corresponds to the call number (a call at 64 kbps).

The ISDN message editor 20 edits the FAC message so that it includes the same data as does the FAC message received from the switch B. The edited FAC message is transmitted to the extension j (step S53).

e: Upon receipt of the FAC message from the switch C, the channel switching controller 230 of the extension j switches from the 64 kbps multiplexer 352 to the H channel multiplexer 353, with which the extension j is connected to an external device, such as a video input/output device, a loudspeaker, or a microphone.

The ISDN message editor 220 includes the communication speed switching completion in the facility data element of the FAC message, and transmits to the switch C the resultant FAC message as a notice indicating that the communication speed has been changed (step S54).

f: Upon receipt of the FAC message from the extension j, the ISDN message editor 20 at the switch C edits the FAC message that includes the same message as the FAC message from the extension j, and transmits the FAC message to the switch B (step S55).

g: Upon receipt of the FAC message from the switch C, the ISDN message editor 20 at the switch B edits the FAC message that includes the same message as the FAC message from the switch C, and transmits the FAC message to the switch A (step S56).

h: Upon receipt of the FAC message from the switch B, the ISDN message editor 20 at the switch A edits the FAC message that includes the same message as the FAC message from the switch B, and transmits the FAC message to the extension i (step S57).

i: Upon receipt of the FAC message from the switch A, the channel switching controller 230 of the extension i switches from the 64 kbps multiplexer 152 to the H channel multiplexer 153, with which the extension i is connected to an external device, such as a video input/output device, a loudspeaker, or a microphone. In addition, the reserved transmission area in the reserved transmission data storage section 290 for the switching source (64 kbps call) is set in the reserved transmission request area of the reserved transmission storage section 290 for the switching destination (an $H_0$ call). The contents in the reserved transmission request area in the reserved transmission data storage section 290 for the switching source are deleted. The switching source call is disconnected following known procedures.

Then, a video conference is begun employing $H_0$ communication (step S58).

Figure 8:
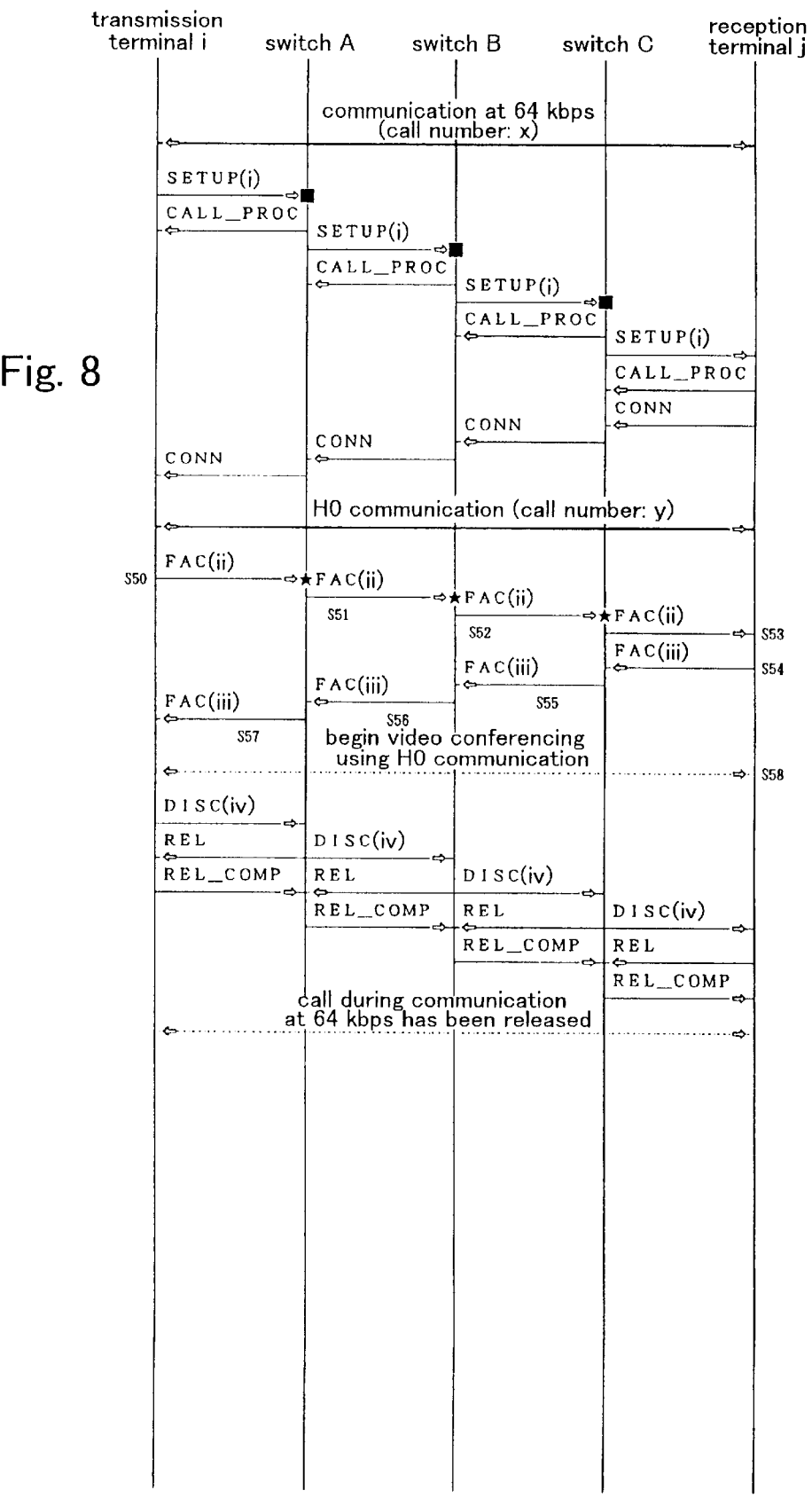
FIG. 8 is a diagram of the processing flow for switching a call of 64 kbps to an $H_0$ call.

The explanatory notes for symbols that are employed for the above sequence in FIG. 8 are as follows.

■: Acquire B channels whose channel class is changed to H channel class by a 64 kbps call (call number: x)

★: Change 64 kbps call (call number x) for monitoring reserved B channels of an $H_0$ call (call number: y)

SETUP(i): Transmission at $H_0$ (call number: y)

FAC(ii): Different call communication speed switching request (transmit notification of switching source call number and instruct continued reserved monitoring)

FAC(iii): Notification of different communication call speed switching completion DISC(iv): Disconnect 64 kbps call (call number: x)

[Processing for Setting Re-Transmission Conditions by Operation of Extension i]

When the extension i issues a transmission request at speed $H_1$ and the switch can not acquire the B channels that are required for $H_1$ communication, the extension i re-transmits the request when transmission disable data (code #58 as a transmission disable reason data element and an available communication speed as diagnostic data) are received from the switch.

The processing for setting the conditions for re-transmission is the following.

When the user at the extension i sets the re-transmission conditions, the terminal operation analyzer 210 is notified of action taken by the user by the terminal operation data notification section 320. The re-transmission conditions that the user sets (the requirement/non-requirement of re-transmission and the communication speed =64 kbps when re-transmission is required) are affirmed, and are set in the re-transmission condition storage section 330.

As is described above, according to the present invention, a block rate relative to H communication (H0 or $H_1$) can be reduced.

Further, when a plurality of switches are connected, the queuing time for the H channel that is ensured between the switches can be reduced, and while the unnecessary queuing of H channels can be eliminated between the switches, connections for the H channel ($H_0$ channel or $H_1$ channel) can be made.

Therefore, especially the present invention contributes greatly to the effective use of lines in a private network, especially.

The above described embodiments are provided only for the explanation of the present invention. The scope of the present invention is not limited to these embodiments, it is defined by the attached claims. Other techniques that are the equivalent of those specified in the claims also fall within the scope of the present invention.

What is claimed is:

1. An ISDN line channel selection method for selecting B channels, which are bundled and serve as an H channel, according to a condition whereunder each of said B channels to be used are registered as either an H channel dedicated class or H channel shared use class, comprising the steps of:

temporarily changing said B channels from said H channel shared use class to said H channel dedicated class if said B channels in said H channel shared use class are busy when a request for connection of said H channel has been received from a transmission side;

queuing until said B channels that form said H channel dedicated class are idle;

connecting said transmission side to said H channel when said B channels that form said H channel dedicated class are idle; and restoring said class of said B channels that has been changed to an original class when connection has been completed or when communication is terminated and is disconnected.

2. An ISDN line channel selection method for selecting B channels, which are bundled and serve as an H channel, according to a condition whereunder each of said B channels to be used are registered as either an H channel dedicated class or H channel shared use class, comprising the steps of:

temporarily changing said B channels from said H channel shared use class to said H channel dedicated class if said B channels in said H channel shared use class are busy when a request for connection of said H channel has been received;

notifying from an ISDN switch to an ISDN terminal that an H channel connection is disabled and a data transfer speed that will be available for said H channel connection, when the ISDN switch receives an H channel connection request from the ISDN terminal and is not capable of obtaining B channels that are required for the H channel connection;

re-transmitting from said ISDN terminal a request for acquiring said B channels for which a requested data transfer speed is enabled at said data transfer speed that is available for said H channel connection;

monitoring by said ISDN switch that has received said request for acquiring said B channels for which said requested data transfer speed is obtainable, to reserve said B channels when idle and transmit a notice that said requested data transfer speed is now available to said ISDN terminal; and changing with selection by said ISDN terminal a communication speed to said requested data transfer speed.

3. The ISDN line channel selection method according to claim 2, further comprising the step of automatically changing and performing communication at said requested data transfer speed by said ISDN terminal which has been notified that said B channels for said requested transfer speed have been acquired.

4. The ISDN line channel selection method according to claim 2, further comprising the step of monitoring a period that elapses from the time said B channels at said requested data transfer speed were obtained until the communication is switched to said requested data transfer speed, and releasing the B channels that are currently being used for communication, when switching is not performed within a specific period of time.

5. The ISDN line channel selection method according to claim 2, further comprising the step of releasing by said ISDN switch which has been notified that said B channels for said requested data transfer speed have been obtained, remaining, unused B channels within the B channels obtained, when said ISDN terminal requests that said switching be performed at a data transfer speed slower than said requested data transfer speed.

6. The ISDN line channel selection method according to claim 5, wherein, when said requested data transfer speed is $H_1$ and a currently used data transfer speed is 64 kbps, said transfer data speed that is slower than said requested data transfer speed is $H_0$.

7. The ISDN line channel selection method according to claim 6, further comprising the step of releasing remaining, unused B channels within the B channels obtained, when a switching request is issued at said data transfer speed of $H_0$ and when a predetermined time elapses.

8. The ISDN line channel selection method according to claim 6, wherein, when a switching request is issued at said data transfer speed of $H_0$, said remaining, unused B channels are used for another call.

9. An ISDN switch system for selecting B channels, which are bundled and serve as an H channel, according to a condition whereunder each of said B channels to be used are registered as either an H channel dedicated class or H channel shared use class, receiving a request for transmission using H channel from a transmission terminal and notifying a data transfer speed at which data transmission is enabled to said transmission terminals, when B channels providing a requested data transfer speed are not ensured, said ISDN switch system comprising:

extraction means for acquiring a second data transfer speed, at which data transmission is enabled, that is included in a transmission request, which is transmitted by said transmission terminal at a first data transfer speed;

means for acquiring, from said H channel shared use class, and connecting a B channel that is required for said second data transfer speed, which is included in said transmission request, and for temporarily changing, to said H channel dedicated class, sequential B channels, including said previously connected B channel that are required for a requested data transfer speed;

storage means for storing changes in channel classes;

means for requesting, for each predetermined time at a transmitter, a transmission at said requested data transfer speed via B channels, including said previously connected B channel;

means for temporarily acquiring said all B channels except for said previously connected channel when all B channels in said H channel dedicated class that include said previously connected B channel are idle;

means for transmitting reserved transmission ready information to said requesting transmitter when said requested transfer speed included in said transmission request is enabled at a receiver;

means for transmitting reserved transmission not ready information to said requesting transmitter when said requested transfer speed included in said transmission request is disabled;

means for releasing said B channels temporarily acquired upon receipt of said reserved transmission not ready information;

means for notifying said transmission terminal that connection of said paths has been completed.

10. An ISDN terminal connected to an ISDN switch for selecting B channels, which are bundled and serve as an H channel, according to a condition whereunder each of said B channels to be used are registered as either an H channel dedicated class or H channel shared use class, the ISDN terminal comprising:

means for temporarily changing said B channels from said H channel shared use class to said H channel dedicated class if said B channels in said H channel shared use class are busy when a request for connection of said H channel has been received;

means for displaying a data transfer speed at which channel switch is permitted upon receipt of a notice from said ISDN switch that transmission at a requested data transfer speed has been enabled;

means for ascertaining whether or not a request for channel switching is present;

means for notifying said ISDN switch that channel switching has been requested;

means for employing B channels that are currently used for communication to switch a communication speed that is currently being used for communication to a new communication speed upon receipt of a notification from said ISDN switch that said channel switching has been completed; and means for notifying a switch when channel switching has been requested and said channel switching means has completed said channel switching.

11. The ISDN terminal according to claim 10, further comprising means for issuing a channel switching request to said switch when a notice is received from said ISDN switch that a requested data transfer speed is available.

12. The ISDN terminal according to claim 10, further comprising:

means for monitoring a predetermined permissible time that elapses before said channel switching request is issued when a notice that a requested transfer speed is available is received from said ISDN switch and for automatically issuing said channel switching request to said ISDN switch when said predetermined permissible time has elapsed; and storage means for storing a time that elapses before a channel switching request is issued.

13. The ISDN terminal according to claim 9, further comprising:

means for monitoring a predetermined permissible time for accepting a channel switching request from said ISDN terminal when said transmission terminal notifies said terminal that said requested data transfer speed is available and for releasing said temporarily acquired B channels when said predetermined permissible time has elapsed and for restoring a channel class for said B channels, which are stored in said channel class change storage section, to said H channel shared use class;

storage means for storing said predetermined permissible time for accepting a channel switching request; and means for notifying said reception side when a request is issued for said temporarily acquired B channels to be released.

14. The ISDN switch system according to claim 9, further comprising:

means for comparing the number of said B channels that are reserved by said switch according to said channel switching request when channels have been changed upon receipt of said channel switching request from said transmission terminal, and for deleting a reserved status of unused B channels when there are unused B channels among said B channels that are reserved, and for restoring said channel class of said B channels, which are stored in said channel class change storage section, to said H channel shared use class.

15. The ISDN switch system according to claim 9, further comprising:

means for monitoring unused B channels when channel switching is performed in response to a request from said transmission terminal and there are unused reserved B channels, for a predetermined time before said unused B channels are released without releasing said B channels, and for releasing said unused B channels when said time has elapsed, and for restoring said channel class of said B channels, which are stored in said channel class change storage section, to said H channel shared use class; and means for storing said permissible time that elapses before said unused B channels are released.

16. The ISDN terminal according to claim 10, further comprising:

means for issuing a transmission request including connected B channels when a transmission request at an available first data transfer speed is transmitted to said switch, together with a required second data transfer speed, and when a connection is effected at said available first data transfer speed, to said switch for specified time at said requested data transfer speed.

17. The ISDN terminal according to claim 10, further comprising:

means for transmitting a transmission request including a second data transfer speed, which is required for a first data transmisssion, further performing transmission at a third data transmittion speed, which is slower than said second data transfer speed, which is required for a new call, when a connection has been completed at the first data transfer speed, and switching a communication speed from said first data transfer speed, for said current call, to said third data transfer speed for a newly connected call to change a switching source to a switching destination for a reserved call to be transmitted to said switch; and means for, when said communication speed is changed, notifying said switch that a request is issued for employing said switching destination call to continue to monitor said reserved B channels for said switching source.

18. The ISDN switch system according to claim 9, further comprising:

means for receiving said transmission request having a new call number from an identical transmission terminal at a third data transfer speed that is slower than said second data transfer speed when said transmission request at said available first data transfer speed is transmitted, together with said required second data transfer speed, from said transmission terminal, and when said reserved B channels for said second data transfer speed are monitored, for receiving a notice for switching reserved status monitoring from said transmission terminal when a connection is effected, and for employing said new call to a switching destination to continuously monitor said reserved B channels that are stored in said channel class change storage section.

19. The ISDN terminal according to claim 10, further comprising:

means for transmitting a transmission request at a available first data transfer speed to said switch together with said required second data transfer speed and for releasing reserved transmissions to said switch at specified times when a connection is effected at said available first data transfer speed, and when reservation of said B channels at said second data transfer speed, which is required for said switch and said terminal, is monitored; and means for transmitting to said switch a request for canceling said monitoring of said reserved B channels.

20. The ISDN switch system according to claim 9, further comprising:

means for receiving a request for canceling monitoring of said reserved B channels from said transmission terminal while said monitoring is in progress, and restoring said channel class of said B channels, which are stored in said channel class change storage section, to said H channel shared use class.

21. The ISDN line channel selection method according to claim 1, wherein said first data transfer speed is 64 kbps, said second data transfer speed is $H_1$, and said third data transfer speed is $H_0$.

22. The ISDN switch system according to claim 9, wherein said first data transfer speed is 64 kbps, and said second data transfer speed is $H_1$.

23. The ISDN switch system according to claim 18, wherein said first data transfer speed is 64 kbps, said second data transfer speed is $H_1$, and said third data transfer speed is $H_0$.

24. The ISDN terminal according to claim 16, wherein said first data transfer speed is 64 kbps, and said second data transfer speed is $H_1$.

25. The ISDN terminal according to claim 17, wherein said first data transfer speed is 64 kbps, said second data transfer speed is $H_1$, and said third data transfer speed is $H_0$.

26. The ISDN terminal according to claim 10, wherein when a transmission request is issued at a requested data transfer speed to said switch and B channels for said requested data transfer speed are not ensured, an available data transfer speed is received from said switch, and further comprising means for setting said requested data transfer speed for communication of a retransmission request.

27. The ISDN terminal according to claim 10, wherein when a transmission request is issued at said requested data transfer speed to said switch and B channels for said requested data transfer speed are not ensured, an available data transfer speed is received from said switch, and further comprising means for setting a re-transmission request condition for said requested data transfer speed; and means for storing said re-transmission request condition.

\* \* \* \* \*